United States Patent
Tsujii et al.

(10) Patent No.: US 11,002,581 B2
(45) Date of Patent: May 11, 2021

(54) PHYSICAL QUANTITY MEASUREMENT DEVICE AND METHOD OF MANUFACTURING PHYSICAL QUANTITY MEASUREMENT DEVICE

(71) Applicant: DENSO CORPORATION, Kariya (JP)

(72) Inventors: Hidehito Tsujii, Kariya (JP); Shinichi Kamiya, Kariya (JP); Keisuke Itakura, Kariya (JP)

(73) Assignee: DENSO CORPORATION, Kariya (JP)

( * ) Notice: Subject to any disclaimer, the term of this patent is extended or adjusted under 35 U.S.C. 154(b) by 115 days.

(21) Appl. No.: 16/556,325

(22) Filed: Aug. 30, 2019

(65) Prior Publication Data

US 2019/0390992 A1    Dec. 26, 2019

Related U.S. Application Data

(63) Continuation of application No. PCT/JP2018/008671, filed on Mar. 7, 2018.

(30) Foreign Application Priority Data

Mar. 21, 2017  (JP)  ............................. JP2017-054770

(51) Int. Cl.
| | |
|---|---|
| *G01F 1/68* | (2006.01) |
| *G01F 1/684* | (2006.01) |
| *G01F 1/692* | (2006.01) |
| *G01F 1/40* | (2006.01) |

(52) U.S. Cl.
CPC .............. *G01F 1/6842* (2013.01); *G01F 1/40* (2013.01); *G01F 1/692* (2013.01)

(58) Field of Classification Search
None
See application file for complete search history.

(56) References Cited

U.S. PATENT DOCUMENTS

2002/0023486 A1*  2/2002  Watanabe  ............... G01F 1/684
                                                            73/202.5
2006/0219231 A1* 10/2006  Uchida  ..................... F01N 3/22
                                                            123/585

FOREIGN PATENT DOCUMENTS

JP              4553898           9/2010

* cited by examiner

*Primary Examiner* — Harshad R Patel
(74) *Attorney, Agent, or Firm* — Nixon & Vanderhye P.C.

(57) ABSTRACT

A physical quantity measurement device for measuring a physical quantity of a fluid includes a housing that includes a bypass flow channel through which a fluid flows and a physical quantity detection unit that detects a physical quantity of the fluid in the bypass flow channel. The housing includes a housing main body made of a dielectric and a covering film that covers at least a part of a surface of the housing main body, and the surface of the housing is positive charged due to positive charges being arranged in the housing main body along the surface of the housing main body or the positive charges being arranged in the covering film along a surface of the covering film.

10 Claims, 16 Drawing Sheets

PHYSICAL QUANTITY MEASUREMENT DEVICE AND METHOD OF MANUFACTURING PHYSICAL QUANTITY MEASUREMENT DEVICE

CROSS-REFERENCE TO RELATED APPLICATIONS

The present application is a continuation application of International Patent Application No. PCT/JP2018/008671 filed on Mar. 7, 2018, which designated the U.S. and claims the benefit of priority from, Japanese Patent Application No. 2017-54770 filed on Mar. 21, 2017, the entire contents of which are incorporated into this application by reference. The entire disclosures of all of the above applications are incorporated herein by reference.

TECHNICAL FIELD

The present disclosure relates to a physical quantity measurement device and a method of manufacturing the physical quantity measurement device.

BACKGROUND

A physical quantity measurement device for measuring a physical quantity of a fluid may be, for example, a flow rate sensor may be provided for measuring a flow rate of intake air into an internal combustion engine. In this case, it is desirable to minimize the effect of foreign matter included in the intake air on the measurements of the flow rate sensor.

SUMMARY

According to a first aspect of the present disclosure, a physical quantity measurement device for measuring a physical quantity of a fluid includes a housing that includes a bypass flow channel through which a fluid flows and a physical quantity detection unit that detects a physical quantity of the fluid in the bypass flow channel, in which the housing includes a housing main body made of a dielectric and a covering film that covers at least a part of a surface of the housing main body, and the surface of the housing is positive charged due to positive charges being arranged in the housing main body along the surface of the housing main body or the positive charges being arranged in the covering film along a surface of the covering film.

According to a second aspect of the present disclosure, a method of manufacturing a physical quantity measurement device including a housing that includes a bypass flow channel through which a fluid flows, and a physical quantity detection unit that detects a physical quantity of the fluid in the bypass flow channel, in which the housing includes a housing main body made of a dielectric, and a covering film layered on the housing main body, and the surface of the housing is positive charged due to positive charges being arranged in the housing main body along the surface of the housing main body or the positive charges being arranged in the covering film along a surface of the covering film includes applying a coating agent for forming the covering film to the surface of the housing main body, cleaning the housing main body while the housing main body is coated with the coating agent, and after cleaning the housing main body, drying the coating agent which is coated on the surface of the housing main body.

BRIEF DESCRIPTION OF DRAWINGS

The above and other objects, features and advantages of the present disclosure will become more apparent from the following detailed description made with reference to the accompanying drawings. In the drawings:

FIGS. 7(a) to 7(d) are diagrams showing a procedure of applying a covering film to a housing main body, in which FIG. 7(a) is a diagram showing a process of applying the covering film to a housing main body, FIG. 7(b) is a diagram showing an applying process, FIG. 7(c) is a diagram showing a cleaning process, and FIG. 7(d) is a diagram showing a drying process.

FIGS. 8(a) to 8(f) are diagrams showing a procedure for applying a covering film to a housing main body according to a second embodiment, in which FIG. 8(a) is a diagram showing a primary molding process, FIG. 8(b) is a diagram showing an applying process, FIG. 8(c) is a diagram showing a cleaning process, FIG. 8(d) is a diagram showing a drying process, FIG. 8(e) is a diagram showing a mounting process, and FIG. 8(f) is a diagram showing a secondary molding process.

DETAILED DESCRIPTION

Figure 1:
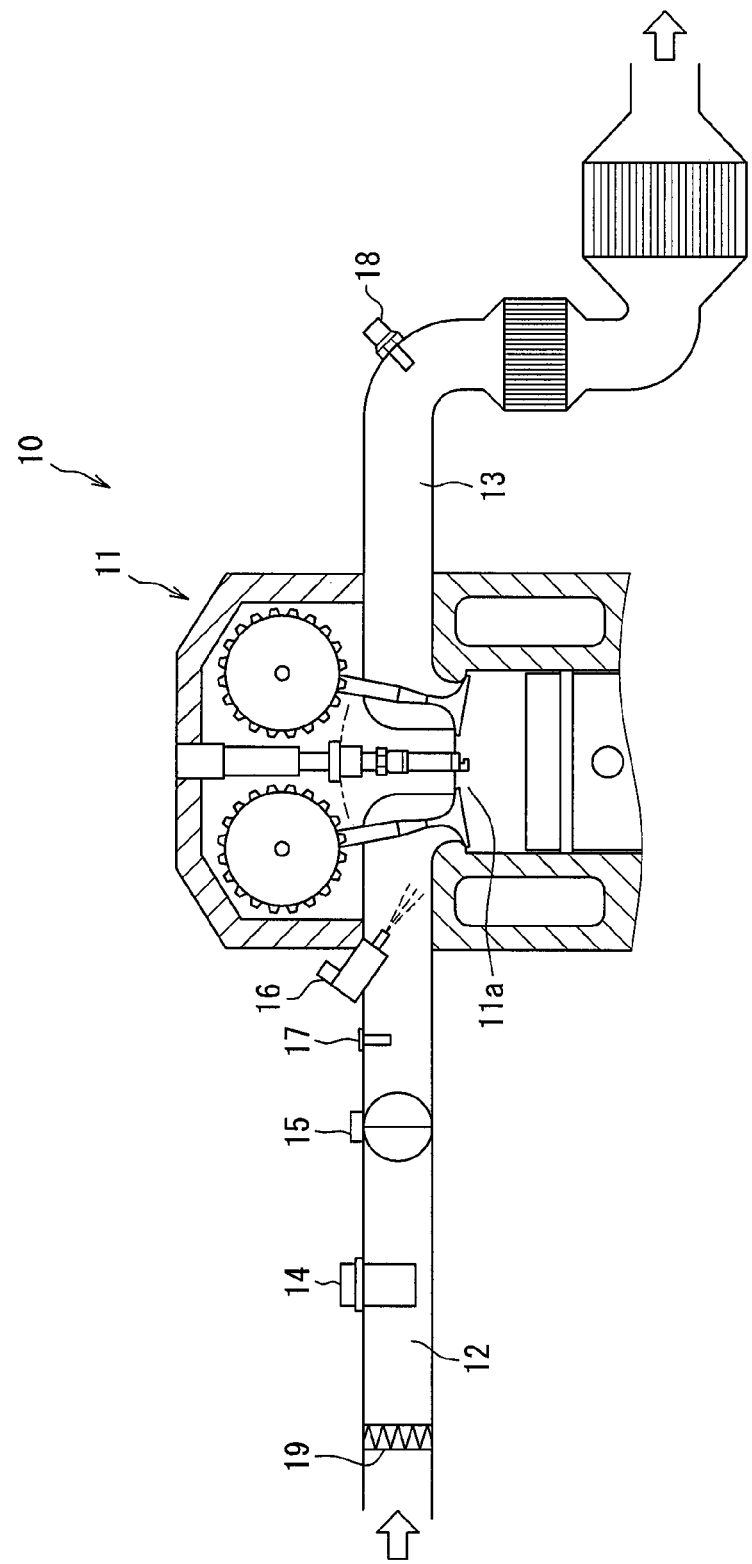
FIG. 1 is a schematic diagram illustrating a configuration of a combustion system according to a first embodiment.

Hereinafter, a plurality of embodiments of the present disclosure will be described with reference to the drawings. Incidentally, the same reference numerals are assigned to the corresponding components in each embodiment, and thus, duplicate descriptions may be omitted. When only a part of the configuration is described in each embodiment, the configuration of the other embodiments described above can be applied to the other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular. Unspecified combinations of the configurations described in the plurality of embodiments and the modification examples are also disclosed in the following description.

First Embodiment

A combustion system 10 shown in FIG. 1 includes an internal combustion engine 11 such as a diesel engine, an intake passage 12, an exhaust passage 13, and an air flow meter 14, and is mounted on a vehicle, for example. The air flow meter 14 is provided in the intake passage 12, and has a function of measuring a physical quantity such as a flow rate, a temperature, and a humidity of an intake air supplied to the internal combustion engine 11. The air flow meter 14 corresponds to a "physical quantity measurement device" for measuring the intake air as a fluid. The intake air is a gas to be supplied to a combustion chamber 11a of the internal combustion engine 11.

The combustion system 10 includes an ECU (Engine Control Unit) (not shown). The ECU is a calculation processing circuit including a processor, a storage medium such as a RAM, a ROM and a flash memory, a microcontroller including an input and output unit, a power supply circuit, and the like. The ECU receives a sensor signal output from the air flow meter 14, sensor signals output from a large number of vehicle-mounted sensors, and the like. The ECU performs an engine control such as the opening degree of a throttle valve 15 and the fuel injection amount of an injector 16 with the use of a measurement result by the air flow meter 14. The ECU is a control device for controlling the operation of the internal combustion engine 11, and the combustion system 10 can also be referred to as an engine control system.

The air flow meter 14 is one of a large number of measurement units included in the combustion system 10. In an intake system and an exhaust system of the internal combustion engine 11, for example, an intake air temperature sensor 17, an air-fuel ratio sensor 18, and the like are provided in addition to the air flow meter 14 as measurement units. The air flow meter 14 is disposed on the downstream side of an air cleaner 19 in the intake passage 12 and on the upstream side of the intake air temperature sensor 17. In that case, in the intake passage 12, the air cleaner 19 is located on the upstream side of the air flow meter 14, and the combustion chamber 11a is located on the downstream side.

Figure 2:
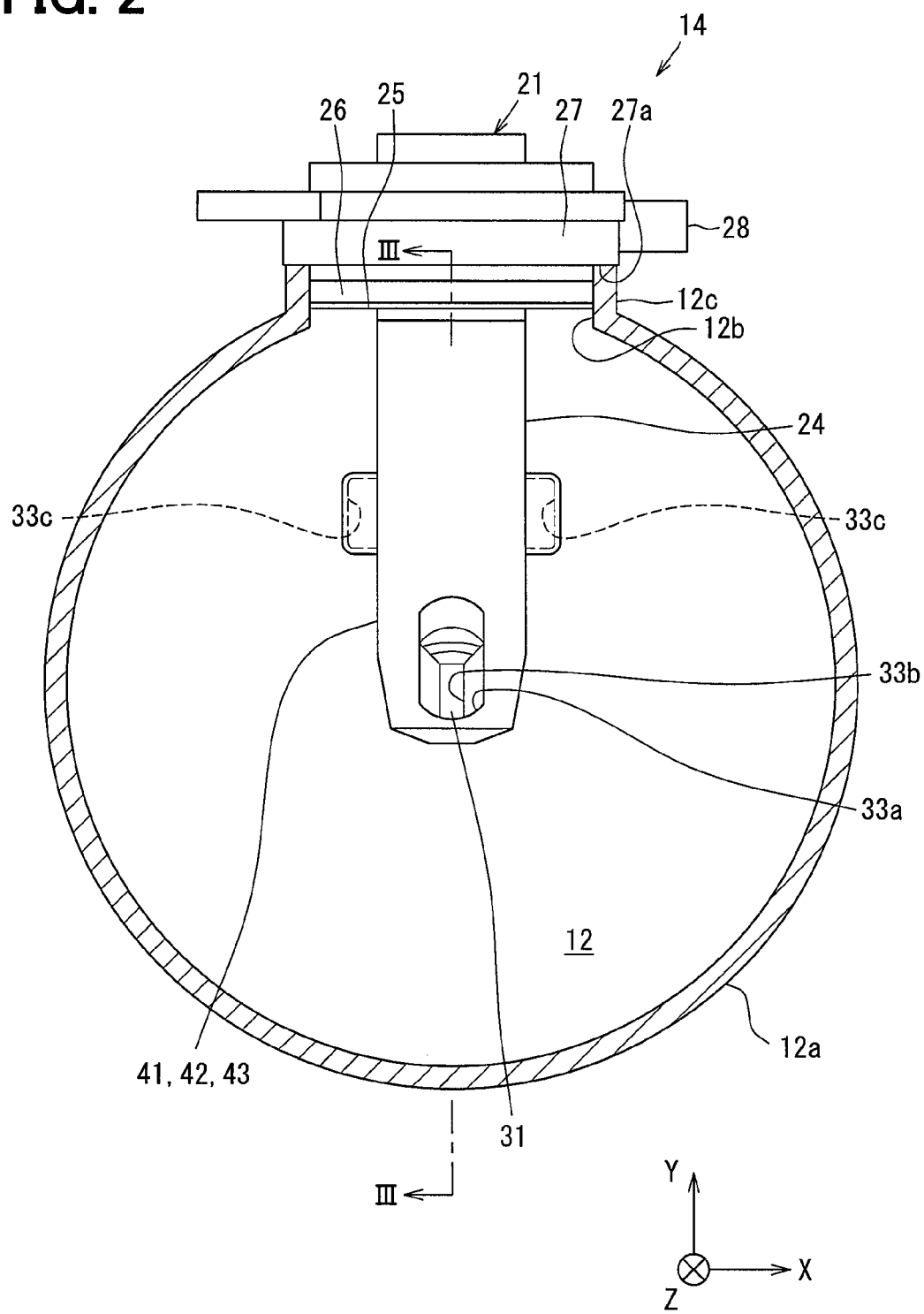
FIG. 2 is a front view of an air flow meter in a state in which the air flow meter is attached to an intake pipe.
Figure 3:
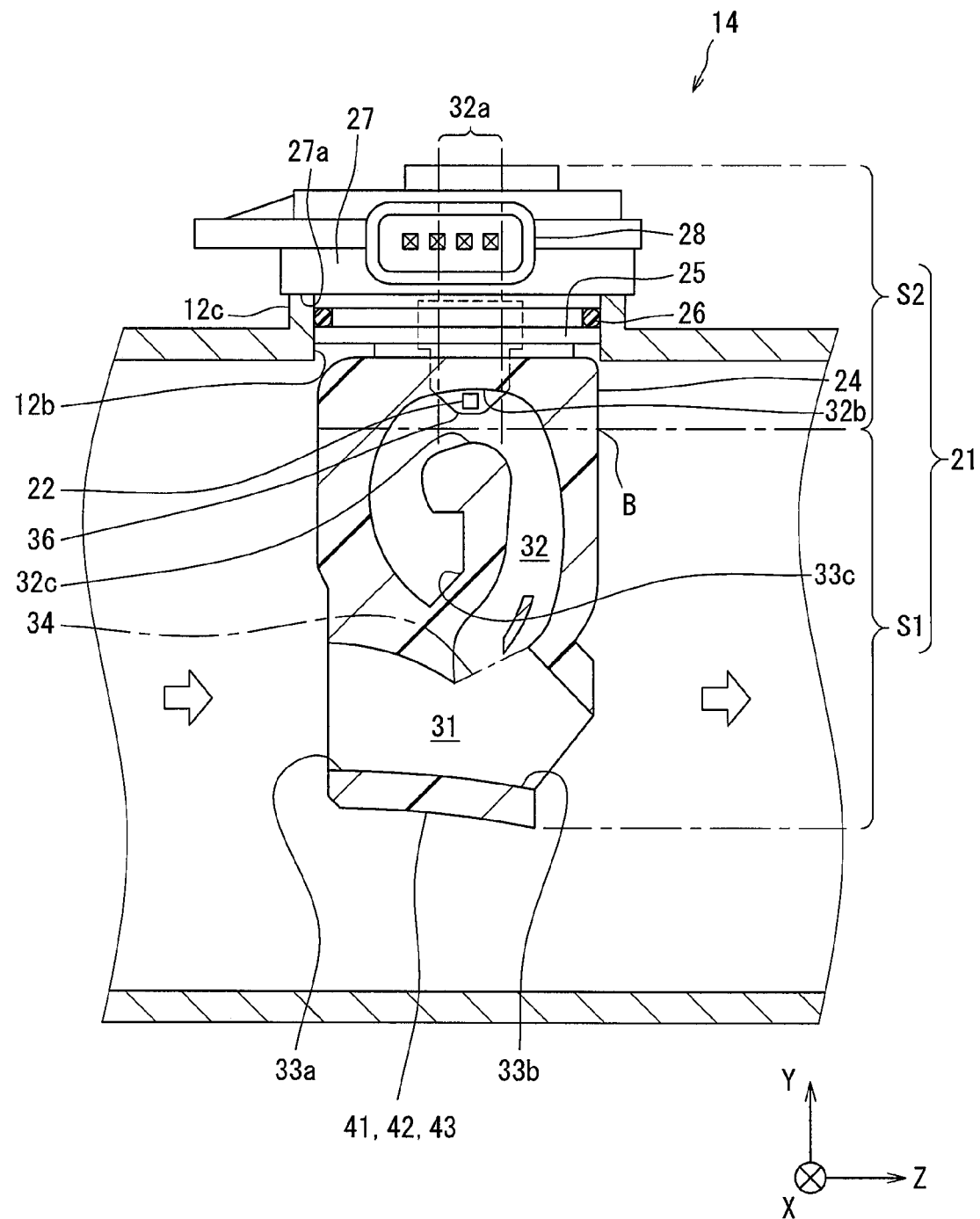
FIG. 3 is a cross-sectional view taken along a line III-III in FIG. 2.

The air flow meter 14 shown in FIGS. 2 and 3 is detachably attached to an intake pipe 12a defining the intake passage 12. The air flow meter 14 is inserted into a sensor insertion hole 12b provided to penetrate through a cylinder wall of the intake pipe 12a, at least part of the air flow meter 14 is located within the intake passage 12. The intake pipe 12a has a flange portion 12c extending from the sensor insertion hole 12b toward an outer peripheral side. The flange portion 12c extends along a peripheral portion of the sensor insertion hole 12b, and is formed in a toric shape, for example. A tip end face of the flange portion 12c extends in a direction orthogonal to a center line of the flange portion 12c. In that case, the tip end face of the flange portion 12c extends in a longitudinal direction of the intake passage 12, that is, in a direction in which the intake air flows in the intake passage 12.

The air flow meter 14 includes a housing 21 and a flow rate detection unit 22. The housing 21 is made of, for example, a resin material or the like. In the air flow meter 14, since the housing 21 is attached to the intake pipe 12a, the flow rate detection unit 22 is brought into contact with the intake air flowing through the intake passage 12. The housing 21 has a flow channel forming portion 24, a fitting portion 25, an O-ring 26, a flange portion 27, and a connector portion 28.

The flow channel forming portion 24 defines flow channels 31 and 32. The flow channels 31 and 32 are defined by an internal space of the flow channel forming portion 24, and introduce a part of the intake air flowing through the intake passage 12 into the interior of the housing 21. The passage flow channel 31 penetrates through the flow channel forming portion 24, and an upstream-side end portion of the passage flow channel 31 is referred to as an inflow port 33a, and a downstream-side end portion of the passage flow channel 31 is referred to as an outflow port 33b. The measurement flow channel 32 is a branch flow channel branched from an intermediate portion of the passage flow channel 31, and has a curved portion to circulate around the inside of the flow channel forming portion 24. However, the measurement flow channel 32 does not make one turn, and a portion close to the upstream end portion and a portion close to the downstream end portion of the measurement flow channel 32 do not overlap with each other in a width direction of the flow channel forming portion 24. Also, the passage flow channel 31 and the measurement flow channel 32 do not overlap with each other in the width direction of the flow channel forming portion 24. The passage flow channel 31 and the measurement flow channel 32 correspond to a "bypass flow channel" through which the fluid flows.

The downstream-side end portions of the measurement flow channel 32 are opened similarly to the downstream-side end portion of the passage flow channel 31, and the downstream-side end portions are referred to as measurement outlets 33c. The measurement flow channel 32 branches toward the downstream end portion, and thus has two measurement outlets 33c, and those measurement outlets 33c are aligned laterally at positions spaced apart from each other in the width direction of the flow channel forming portion 24. As described above, because the passage flow channel 31 and the measurement flow channel 32 do not overlap with each other in the width direction of the flow channel forming portion 24, the measurement outlets 33c and the outflow port 33b do not overlap with each other in the width direction of the flow channel forming portion 24. The intake passage 12 may be referred to as a main passage, and the passage flow channel 31 and the measurement flow channel 32 may be collectively referred to as a sub-passage.

The fitting portion 25 is a portion that is fitted into the sensor insertion hole 12b through the O-ring 26. The O-ring 26 is a member for sealing the intake passage 12 and the outside of the intake pipe 12a. The O-ring 26 is externally fitted to the fitting portion 25, and is interposed between the fitting portion 25 and the sensor insertion hole 12b in a state where the O-ring 26 entered an inner peripheral side of the flange portion 12c. The flange portion 27 is disposed on a side opposite to the flow channel forming portion 24 across the fitting portion 25, and covers the sensor insertion hole 12b from an outer peripheral side of the intake pipe 12a. The flange portion 27 is caught by the tip portion of the flange portion 12c of the intake pipe 12a to restrict the housing 21 from excessively entering the intake passage 12. The flange portion 27 has a flange surface 27a facing the flow channel forming portion 24. The flange surface 27a extends in parallel with the tip end surface of the flange portion 12c, and overlaps with the tip end face of the flange portion 12c.

The connector portion 28 surrounds multiple terminals. A plug portion is inserted into the connector portion 28. The plug portion is provided at an end portion of a connection line electrically connected directly or indirectly to an engine control device such as an ECU, and mates with the connector portion 28.

The flow rate detection unit 22 is, for example, a thermal type flow rate sensor using a heat generating resistive element. The flow rate detection unit 22 is disposed at an intermediate position of the measurement flow channel 32. When the housing 21 is attached to the intake pipe 12a, an intake air flowing through the measurement flow channel 32 is supplied to the flow rate detection unit 22. The flow rate detection unit 22 is electrically connected to multiple terminals provided in the connector portion 28. The flow rate detection unit 22 outputs a sensor signal corresponding to the intake flow rate and corresponding to a flow velocity of the air flowing through the measurement flow channel 32 to the engine control device as a flow rate signal. The flow rate detection unit 22 detects a flow rate of the intake air flowing in the intake passage 12 by detecting the flow rate of the intake air flowing in the measurement flow channel 32. The flow rate detection unit 22 corresponds to a "physical quantity detection unit" that detects the flow rate of the intake air as a physical quantity. Further, the flow rate detection unit 22 is not limited to a thermal type flow rate sensor, and may be a movable flap type flow rate sensor, a Karman vortex type flow rate sensor, or the like.

The air flow meter 14 has a temperature detection unit for detecting a temperature and a humidity detection unit for detecting a humidity in addition to the flow rate detection unit 22. The temperature detection unit and the humidity detection unit are provided on an outer peripheral side of the housing 21, and output a sensor signal corresponding to the temperature and the humidity of the intake air flowing through the intake passage 12 as a temperature signal and a humidity signal. For example, the air flow meter 14 has a support for supporting those detection units on the outer peripheral side of the housing 21, and the support is fixed to the housing 21.

In the air flow meter 14, a direction in which the two measurement outlets 33c are aligned is referred to as a width direction X, a direction in which the flow channel forming portion 24 and the flange portion 27 are aligned is referred to as a height direction Y, and a direction in which the inflow port 33a and the outflow port 33b are aligned is referred to as a depth direction Z. The width direction X, the height direction Y, and the depth direction Z are orthogonal to each other, and the flange surface 27a of the flange portion 27 extends in parallel to both the width direction X and the depth direction Z. In a state in which the air flow meter 14 is attached to the intake pipe 12a, the inflow port 33a faces the upstream side of the intake passage 12, and the outflow port 33b and the measurement outlets 33c face the downstream side. In that case, it is considered that a direction in which the intake air flows in the intake passage 12 is the depth direction Z, and an inflow direction of the inflow air from the inflow port 33a is likely to be the same as the depth direction Z. In the air flow meter 14, the intake air flowing in from the inflow port 33a passes through the passage flow channel 31 and the measurement flow channel 32, and flows out from the outflow port 33b and the respective measurement outlets 33c.

In a flow channel boundary portion 34, which is a boundary between the passage flow channel 31 and the measurement flow channel 32, an intermediate portion of the passage flow channel 31 is opened toward the flange portion 27 in the height direction Y. In the flow channel boundary portion 34, the intermediate portion of the passage flow channel 31 and the upstream-side end portion of the measurement flow channel 32 are connected to each other, and the upstream-side end portion of the measurement flow channel 32 can also be referred to as a measurement inlet. The measurement flow channel 32 has a portion extending in the depth direction Z between the flow channel boundary portion 34 and the measurement outlets 33c, and the portion is referred to as a reverse flow channel portion 32a through which the intake air flows in a direction opposite to the intake passage 12. In the present embodiment, the flow rate detection unit 22 is provided in the reverse flow channel portion 32a.

The air flow meter 14 has a sensor sub-assembly including the tip-type flow rate detection unit 22, and the sensor sub-assembly is referred to as a sensor S/A 36. In that instance, the sensor S/A 36 may be referred to as a sensor unit, and the air flow meter 14 may be referred to as a tip-type flow rate measurement device.

Figure 4:
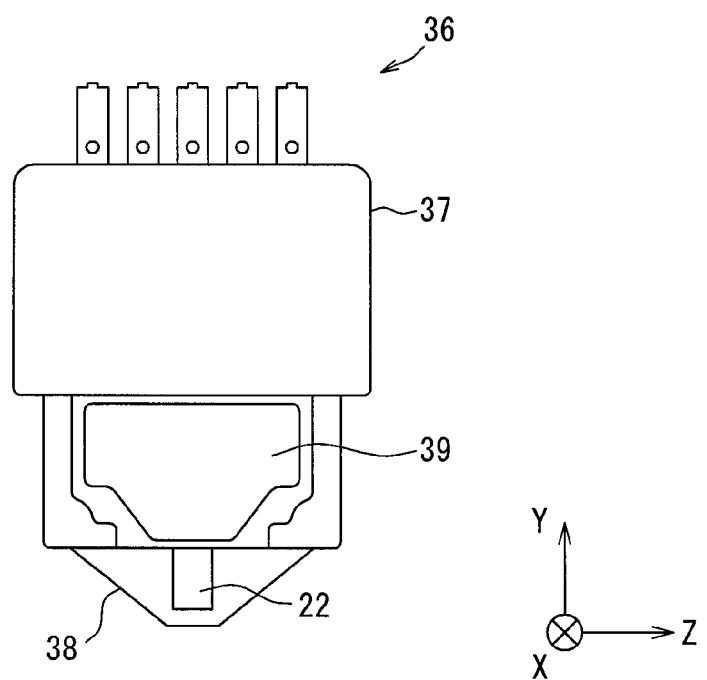
FIG. 4 is a front view showing a configuration of a sensor S/A.

As shown in FIG. 4, the sensor S/A 36 includes a case body 37 and a sealing portion 39 in addition to the flow rate detection unit 22, and those components are unitized together. The case body 37 is a mold resin formed by molding a synthetic resin material, and supports the flow rate detection unit 22 in an exposed state. In the case body 37, a portion supporting the flow rate detection unit 22 is referred to as a detection support portion 38, and the detection support portion 38 is a protruding portion that protrudes laterally from an end portion of the case body 37. In the sensor S/A 36, the flow rate detection unit 22 is electrically connected to the circuit chip through a bonding wire and a lead frame, and the sealing portion 39 has a potting resin for sealing the bonding wire and the lead frame.

As shown in FIG. 3, the sensor S/A 36 is embedded in a portion closer to the flange portion 27 than the passage flow channel 31 and the measurement flow channel 32 in a state where the detection support portion 38 is exposed to the measurement flow passage 32 in the housing 21. As a result, the flow rate detection unit 22 comes into contact with the intake air flowing through the measurement flow channel 32.

Figure 5:
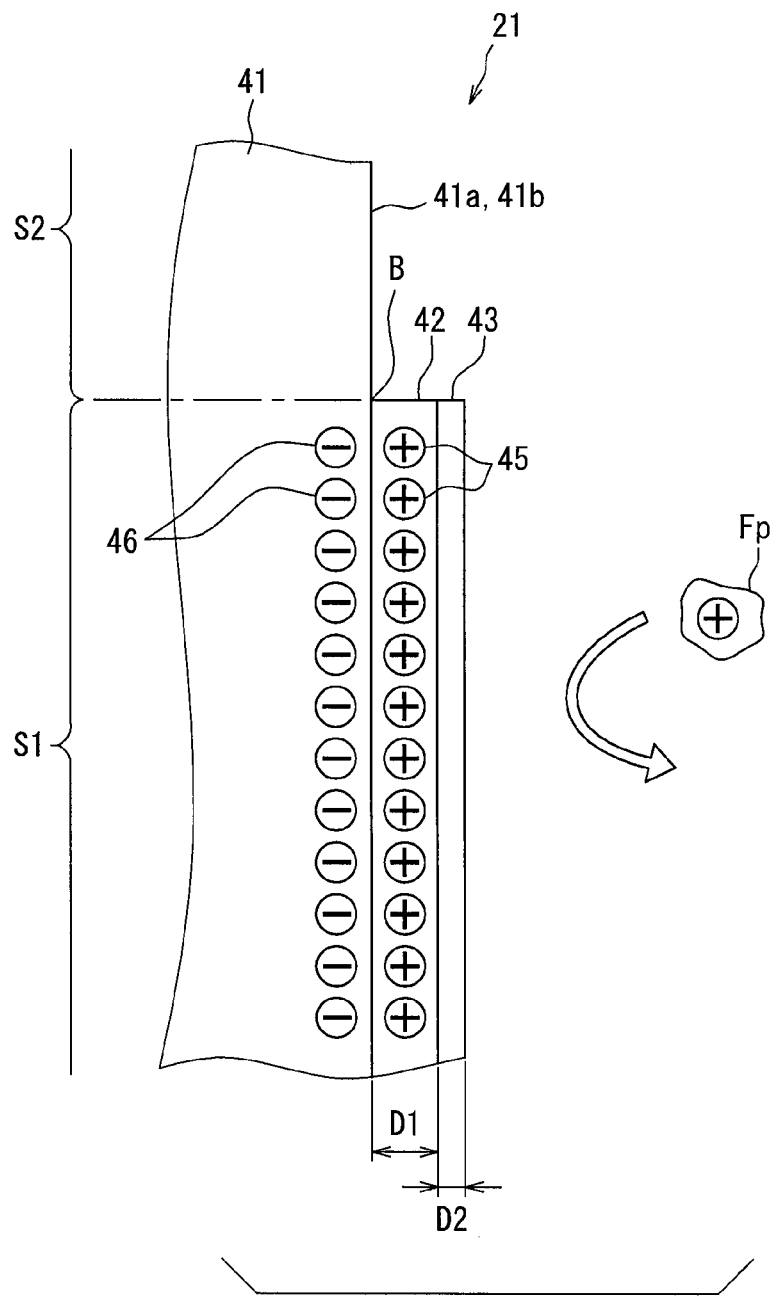
FIG. 5 is a schematic diagram illustrating a covering film.

As shown in FIG. 5, the housing 21 includes a housing main body 41, a covering film 42 which covers the housing main body 41, and a protective film 43 which protects the covering film 42. The housing main body 41 is a dielectric made of a synthetic resin material or the like. The housing main body 41 has an outer surface 41a which is an outer peripheral surface of the housing main body 41, and a flow channel surface 41b which forms the flow channels 31 and 32. The outer surface 41a is an entire outer peripheral surface of the housing main body 41, while the flow channel surface 41b is a part of an inner peripheral surface of the housing main body 41. For example, the connector portion 28 has an insertion hole into which a plug portion is inserted, but an inner side surface of the insertion hole is included in the inner peripheral surface of the housing main body 41, and is not included in the flow channel surface 41b. For that reason, only the flow channel forming portion 24 has the flow channel surface 41b. The outer surface 41a is provided in each of the flow channel forming portion 24, the fitting portion 25, the flange portion 27, and the connector portion 28. The surface of the housing main body 41 includes both an outer peripheral surface and an inner peripheral surface as the outer surface 41a.

The covering film 42 is a film covering a part of the housing main body 41 in a state of overlapping with the surface of the housing main body 41. The covering film 42 of the present embodiment overlaps with the outer surface 41a and the flow channel surface 41b of the housing main body 41, to thereby cover a part of each of the outer surface 41a and the flow channel surface 41b. The covering film 42 is made of a synthetic resin material such as silicon, and is less likely to be negatively charged as compared with the housing main body 41.

The housing 21 has a covering region S1 in which the housing main body 41 is covered with the covering film 42, and an exposed region S2 in which the housing main body 41 is not covered with the covering film 42, and a boundary portion between those regions Pa and Pb are referred to as a covering boundary portion B. The covering region S1 and the exposed region S2 divide a surface region of the housing 21 into two regions including a base end side which is the flange portion 27 side and a tip side which is the opposite side of the flange portion 27 in the height direction Y. In that case, the covering region S1 and the exposed region S2 are aligned in the height direction Y as a predetermined direction. The exposed region S2 may also be referred to as a non-covered region. A thickness dimension D1 of the covering film 42 is, for example, several hundred μm or less.

The protective film 43 overlaps with the surface of the covering film 42, thereby covering the entire covering film 42. While the protective film 43 of the present embodiment is provided over the entire covering region S1, the protective film 43 is not provided in the exposed region S2. The protective film 43 is made of a synthetic resin material such as silicon and serves as an insulator. In the covering region S1, the protective film 43 forms the surface of the housing 21, and in the exposed region S2, not the protective film 43 but the housing main body 41 forms the surface of the housing 21. A thickness dimension D2 of the protective film 43 is smaller than the thickness dimension D1 of the covering film 42. For example, the thickness dimension D2 of the protective film 43 is approximately ½ of the thickness dimension D1 of the covering film 42.

In the housing 21, the covering boundary portion B is disposed at the same position on the outer side and the inner side of the housing main body 41. As shown in FIG. 3, the covering boundary portion B is disposed at an intermediate position of the flow channel forming portion 24 in the height direction Y, and extends in a direction orthogonal to the height direction Y. In the housing main body 41, in both of the outer surface 41a and the flow channel surface 41b, the covering film 42 extends from the covering boundary portion B toward a side opposite to the flange portion 27 in the height direction Y, and the entire tip side portion of the covering boundary portion B is covered with the covering film 42.

The covering boundary portion B is disposed closer to the tip side of the housing 21 than the flow rate detection unit 22 and the detection support portion 38. In that case, the flow rate detection unit 22 and the detection support portion 38 are included not in the covering region S1 but in the exposed region S2, and the covering film 42 is not provided to the flow rate detection unit 22 and the detection support portion 38. The flow rate detection unit 22 is disposed between a ceiling surface 32b on the flange portion 27 side and a floor surface 32c on the opposite side of the flange portion 27 in the reverse flow channel portion 32a of the measurement flow channel 32, and the covering boundary portion B is disposed between the flow rate detection unit 22 and the floor surface 32c. In the height direction Y, the covering boundary portion B is vertically separated from the flow rate detection unit 22 and the detection support portion 38. In the housing 21, the flow channel forming portion 24, the fitting portion 25, the flange portion 27, and the connector portion 28 are not included in the covering region S1, but are included in the exposed region S2.

As shown in FIG. 5, in the covering region S1, a large number of positive charges 45 are arranged along the surface of the covering film 42, so that the surface of the housing 21 is charged with positive charges 45. In the present embodiment, since the covering film 42 is maintained in a positively charged state, a large number of negative charges 46 are arranged along the surfaces of the outer surface 41a and the flow channel surface 41b of the housing main body 41. In that case, the housing 21 is not positively charged or negatively charged, and is polarized as a whole. However, as the covering film 42 is positively charged, the housing main body 41 is negatively charged. The housing 21 as a whole may be positively or negatively charged.

When the positive foreign matter Fp, which is a positively charged foreign matter, approaches the air flow meter 14 in the intake passage 12, an electric repulsion force is generated between the positive foreign matter Fp and the positive charges 45 on the surface of the housing 21. For that reason, the positive foreign matter Fp is less likely to adhere to the housing 21. For example, in the intake passage 12, when the positive foreign matter Fp reaches a side position of the housing 21 in the width direction X, the positive foreign matter Fp easily advances to the downstream side of the housing 21 without being suctioned by the outer surface 41a of the housing main body 41. When the positive foreign matter Fp enters the passage flow channel 31, the positive foreign matter Fp is likely to be discharged from the outflow port 33b of the passage flow channel 31 or the measurement outlets 33c of the measurement flow channel 32 without being suctioned by the flow channel surface 41b of the housing main body 41.

As the foreign matter taken into the intake passage 12 together with the intake air, dust such as sand, sand dust, and trash is assumed. It is assumed that the foreign matter such as sand, which is likely to be positively charged, has already become the positive foreign matter Fp at a timing before entering the intake passage 12. Even if the positive foreign matter Fp is not formed at a timing before entering the intake passage 12, the positive foreign matter Fp may be formed by passing through the air cleaner 19 after entering the intake passage 12.

Figure 6:
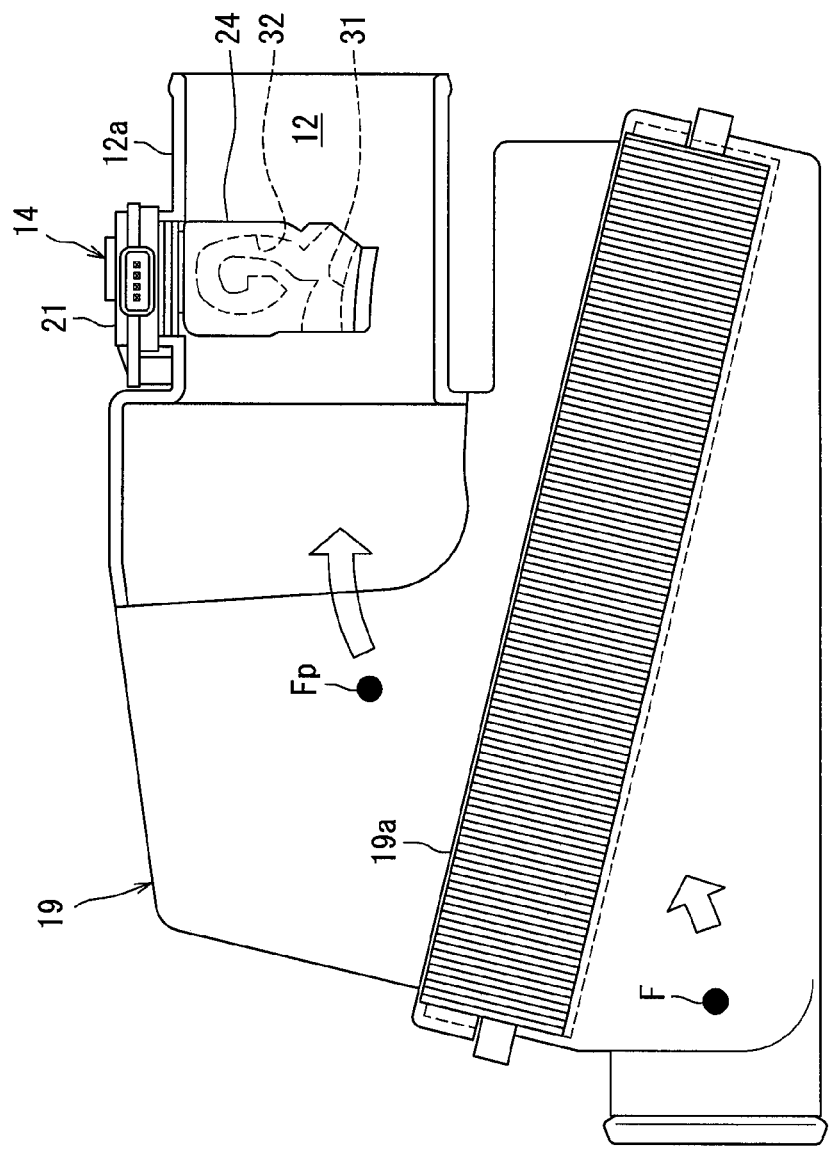
FIG. 6 is a diagram showing a configuration of an air cleaner.

As shown in FIG. 6, the air cleaner 19 has an air filter 19a. The air filter 19a has a mesh or the like for removing the foreign matter mixed with the intake air, and is made of a synthetic resin material such as polyethylene, for example. In this example, in the air cleaner 19 in which the air filter 19a is made of a material such as polyethylene, which is likely to be negatively charged, the foreign matter such as sand, which is likely to be positively charged, reaches or passes through the air filter 19a, resulting in a high possibility that the foreign matter is positively charged. For example, as shown in FIG. 6, when the foreign matter F that has not yet been positively charged reaches the air filter 19a, there is a high possibility that the foreign matter F becomes a positive foreign matter Fp that has passed through the air filter 19a. The positive foreign matter Fp which has already been positively charged is further positively charged.

For example, in a configuration in which the housing 21 does not have the covering film 42, if the foreign matter approaching or contacting the housing 21 is liable to be positively charged, there is a high possibility that the foreign matter is positively charged and the housing 21 is negatively charged. Even if the foreign matter that is liable to be positively charged has already become the positive foreign matter Fp, the housing 21 is liable to be more negatively charged by the positive foreign matter Fp approaching the housing 21. Then, it is assumed that the negative electric charges charged in the housing 21 increase by repeating the approach and the contacting of the foreign matter which is likely to be positively charged, and when the negative charges increase to some extent, the negative electric charges diffuse from the housing 21 to the sensor S/A 36. In that case, in the sensor S/A 36, it is considered that the case body 37, which is made of a mold resin, is charged by the negative charges, and the flow rate detection unit 22 is also negatively charged.

As described above, when the positive foreign matter Fp reaches the air flow meter 14 in the intake passage 12, it is considered that the positive foreign matter Fp is likely to adhere to the housing 21 which is negatively charged. When the flow rate detection unit 22 is negatively charged and the positive foreign matter Fp enters the measurement flow channel 32, it is considered that the positive foreign matter Fp is likely to adhere to the flow rate detection unit 22. For example, a situation is assumed in which the positive foreign matter Fp is advancing in a direction that does not collide with the flow rate detection unit 22, but the advancing direction of the positive foreign matter Fp is changed because an electric attraction force is generated between the positive foreign matter Fp and the flow rate detection unit 22, and the positive foreign matter Fp adheres to the flow rate detection unit 22. As described above, if the foreign matter adheres to the flow rate detection unit 22, there is a concern that the detection accuracy of the flow rate detection unit 22 is lowered due to the adherence of the foreign matter.

On the other hand, in the present embodiment, since the housing 21 has the covering film 42, the housing 21 is less likely to be negatively charged by the foreign matter which is likely to be positively charged. This makes it possible to inhibit that the housing 21 is negatively charged to negatively charge the flow rate detection unit 22, and the positive foreign matter Fp is likely to adhere to the flow rate detection unit 22.

Next, as a method of manufacturing the air flow meter 14, a procedure of applying the covering film 42 to the housing main body 41 will be described with reference to FIG. 7.

Figure 7A:
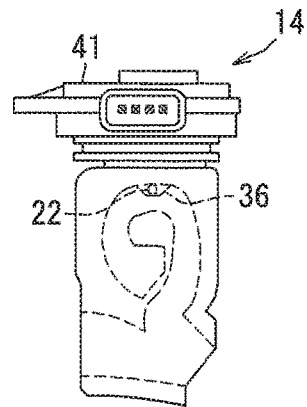

The air flow meter 14 shown in FIG. 7(a) is in a state in which the other steps are completed, leaving the step of applying the covering film 42 and the protective film 43 to the housing main body 41. The air flow meter 14 in this state is in a state in which the flow rate detection unit 22 is attached to the housing main body 41.

Figure 7B:
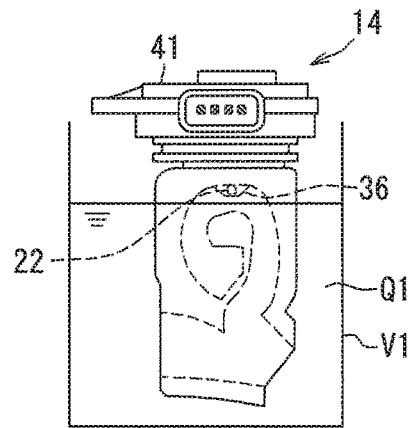

Then, as shown in FIG. 7(b), an applying process of applying the covering film 42 to the housing main body 41 is performed. In this step, a liquid coating agent Q1 for applying the covering film 42 is stored in a first container V1, and dipping is performed by immersing the housing main body 41 in the coating agent Q1. A time during which the housing main body 41 is immersed in the coating agent Q1 is a predetermined time, for example, 30 seconds. The predetermined time may be increased or decreased in accordance with a temperature and components of the coating agent Q1, a proportion of each component, a shape of the housing main body 41, and the like. Further, a planned position of the covering boundary portion B is set in the housing main body 41, and the housing main body 41 is submerged in the coating agent Q1 so that a liquid surface of the coating agent Q1 coincides with the covering boundary portion B.

The coating agent Q1 contains a silicon component, an alcohol component, a fluororesin component, and a charging treatment component. In the content of the coating agent Q1, the charging treatment component is the largest, followed by the alcohol component, and the fluororesin component is the smallest. The silicon component and the fluororesin component have a function of smoothing the surface of the covering film 42. The alcohol component has a function of diluting the coating agent Q1. With adjustment of the degree of dilution of the coating agent Q1, a thickness dimension of the covering film 42 can be increased or decreased.

The charging treatment component is a component for positively charging a predetermined liquid, and the liquid containing the charging treatment component is referred to as charging treatment water. Since the coating agent Q1 contains the charging treatment water, the coating agent Q1 has a positive charge, and when the coating agent Q1 is applied to the housing main body 41 by dipping, a large number of positive charges 45 are arranged along the surface of the housing main body 41.

Figure 7C:
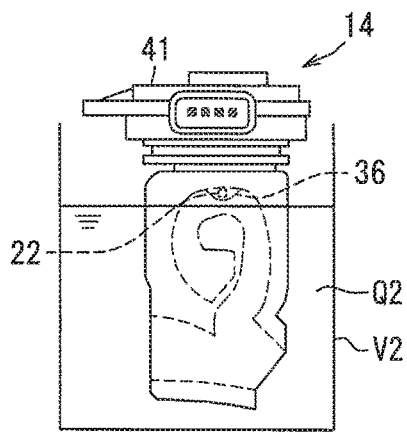

After the applying process is completed, as shown in FIG. 7(c), a cleaning process for cleaning the housing main body 41 is performed. In this step, a cleaning agent Q2 such as water is stored in a second container V2, and the housing main body 41 is immersed in the cleaning agent Q2. A time during which the housing main body 41 is immersed in the cleaning agent Q2 is a predetermined time, for example, 30 seconds. The predetermined time may be increased or decreased in accordance with the temperature and components of the cleaning agent Q2, the proportion of each component, the shape of the housing main body 41, and the like, similarly to the dipping time by the coating agent Q1, or may be a time of the same length as the dipping time.

The above cleaning process is performed, thereby being capable of removing an excess coating agent Q1 adhering to the housing main body 41 and making the thickness dimension of the coating agent Q1 applied to the housing main body 41 uniform. In addition, with the use of a container different from the first container V1 storing the coating agent Q1 as the second container V2 storing the cleaning agent Q2, the cleaning process can be performed quickly after the applying process so that the coating agent Q1 applied to the housing main body 41 does not dry.

In addition, the housing main body 41 is submerged in the cleaning agent Q2 so that the same range of the housing main body 41 as an applying range of the coating agent Q1 is immersed in the cleaning agent Q2. It should be noted that the housing main body 41 may be submerged in the cleaning agent Q2 to a depth deeper than that in which the housing main body 41 is submerged in the coating agent Q1 as long as the flow rate detection unit 22 and the detection support portion 38 are not immersed in the cleaning agent Q2. In that case, the coating agent Q1 can be appropriately removed by the cleaning agent Q2 also in an upper end portion of the region to which the coating agent Q1 is applied.

Figure 7D:
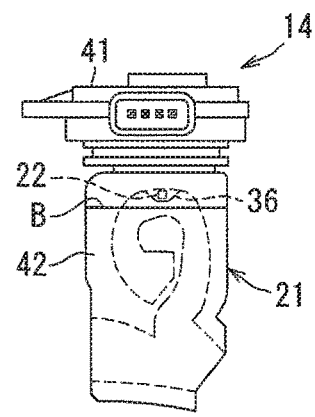

After the cleaning process is completed, as shown in FIG. 7(d), a drying process for drying the coating agent Q1 and the cleaning agent Q2 is performed. In the above step, the housing main body 41 is placed in a room temperature environment, and is naturally dried in a state in which the housing main body 41 is suspended by a suspending tool for a predetermined time such as 24 hours, for example. When the drying process is completed, the operation of applying the covering film 42 to the housing main body 41 is completed, and the air flow meter 14 is completed.

After the covering film 42 has been applied to the housing main body 41, as an operation of applying the protective film 43 to the covering film 42 in an overlapping manner, an applying process, a cleaning process, and a drying process are performed in the same manner as the operation of applying the covering film 42. In the applying process, dipping is performed by immersing the housing main body 41 in the coating agent for coating the protective film 43 together with the covering film 42. In this example, the housing main body 41 is immersed in the coating agent so that a liquid surface of the coating agent coincides with the covering boundary portion B with an upper end portion of the covering film 42 as the covering boundary portion B. The coating agent of the protective film 43 contains a silicon component, an alcohol component, and a fluororesin component. The silicon component and the fluororesin component have a function of smoothing the surface of the protective film 43. For that reason, even if the foreign matter comes into contact with the protective film 43, a friction between the foreign matter and the protective film 43 is inhibited from occurring, and the foreign matter is inhibited from adhering to the protective film 43. In other words, contamination of the protective film 43 by foreign matter is inhibited.

According to the present embodiment described so far, a large number of positive charges 45 are arranged in the covering film 42 of the housing 21. For that reason, even if the positive foreign matter Fp approaches the housing 21, the positive foreign matter Fp is less likely to come into contact with the housing 21 due to the generation of the electric repulsion force. In that case, the housing 21 is less likely to be negatively charged with the friction between the positive foreign matter Fp and the housing 21, as a result of which, the flow rate detection unit 22 is less likely to be negatively charged. This makes it possible to inhibit the detection accuracy of the flow rate detection unit 22 from being lowered due to the positive foreign matter Fp adhering to the flow rate detection unit 22, to inhibit the contamination of the flow rate detection unit 22 from occurring due to the adhesion of the positive foreign matter Fp, and the like.

According to the present embodiment, since the covering film 42 is protected by the protective film 43, even if a foreign matter that is not positively charged collides with the housing 21, for example, the covering film 42 can be prevented from being damaged or peeled off by the foreign matter. Moreover, at the time of manufacturing the air flow meter 14, since the coating agent for generating the protective film 43 contains a silicon component and a fluororesin component, the surface of the protective film 43 tends to be smooth. In that case, even if the foreign matter collides with the surface of the protective film 43, a friction is less likely to occur between the protective film 43 and the foreign matter, so that the protective film 43 can be inhibited from peeling off and adhering to the protective film 43 along with the collision of the foreign matter. In addition, since the protective film 43 contains a silicon component or a fluororesin component, a water repellent effect can be imparted to the protective film 43, and a salt damage countermeasure can be applied to the protective film 43.

According to the present embodiment, since the covering film 42 covers the flow channel surface 41*b* of the housing main body 41, the positive foreign matter Fp is less likely to adhere to the flow channel surface 41*b* due to the electric attraction force. This makes it possible to inhibit that a large amount of positive foreign matter Fp adheres to the flow channel surface 41*b* and becomes a lump, the lump is peeled off from the flow channel surface 41*b* and travels through the measurement flow channel 32, and collides with the flow rate detection unit 22, to thereby damage the flow rate detection unit 22 or lower the detection accuracy of the flow rate.

According to the present embodiment, since the covering film 42 even partially covers the outer surface 41*a* of the housing main body 41, even if the positive foreign matter Fp comes in contact with the surface of the housing 21, the housing 21 can be inhibited from being negatively charged. In this example, in the intake passage 12, it is considered that foreign matter such as the positive foreign matter Fp tends to collide with the housing 21 because the flow of the intake air is fast. On the other hand, even if the positive foreign matter Fp collides with the housing 21, the housing 21 and the housing main body 41 are less likely to be negatively charged due to the presence of the covering film 42. For that reason, it is preferable to apply the covering film 42 to the outer surface 41*a* of the housing main body 41 in order to inhibit the contamination of the flow rate detection unit 22.

According to the present embodiment, the surface region of the housing 21 is divided into the covering region S1 and the exposed region S2. For that reason, even if a method in which a work load of dipping is relatively small is employed at the time of manufacturing the air flow meter 14, the covering film 42 can be applied to the housing main body 41. In that case, the covering film 42 can be applied to the housing 21 as wide as possible without excessively increasing the work load. In addition, since the flow rate detection unit 22 is included in the exposed region S2, an influence on the output characteristics of the flow rate detection unit 22 and a decrease in detection accuracy due to the flow rate detection unit 22 being covered with the covering film 42 can be inhibited.

According to the present embodiment, since the covering film 42 is likely to be negatively charged as compared with the housing main body 41, even if a foreign matter that is likely to be positively charged approaches or contacts the covering film 42, the covering film 42 can be inhibited from being negatively charged and the foreign matter can be inhibited from being positively charged. This makes it possible to exert a restraining force against the housing 21 being negatively charged, and the flow rate detection unit 22 being also negatively charged accordingly.

According to the present embodiment, since after the coating agent Q1 has been applied to the housing main body 41, the housing main body 41 in that state is cleaned at the time of manufacturing the air flow meter 14, the excess coating agent Q1 adhering to the housing main body 41 can be removed. This makes it possible to inhibit the thickness dimension D1 of the covering film 42 from becoming too large or uneven.

In this example, it is considered that a portion where the thickness dimension D1 of the covering film 42 becomes too large is likely to be solidified such that the multiple positive charges 45 overlap with the covering film 42 in the thickness direction of the covering film 42 due to the fact that the thickness dimension D1 is excessively large as compared with the diameter of the positive charges 45. In this case, the positive charges 45 are not uniformly arranged in the entire covering film 42, and there is a high possibility that a region in which the positive charges 45 do not exist is generated, and there is a concern that a repulsive force against the positive foreign matter Fp is not appropriately generated in this region. For that reason, it is considered that the housing main body 41 is negatively charged by the positive foreign matter Fp ignoring the presence of the covering film 42, or the positive foreign matter Fp adheres to the covering film 42. On the other hand, according to the present embodiment, since the cleaning process is included in the operation of applying the covering film 42, the covering film 42 is uniformly thinned, and the positive charges 45 are likely to be uniformly disposed along the surface of the housing main body 41 without overlapping with the covering film 42 in the thickness direction of the covering film 42. This makes it possible to inhibit the positive foreign matter Fp from adhering to the covering film 42 and the housing main body 41 from being negatively charged even though the covering film 42 is applied to the housing main body 41.

According to the present embodiment, since the thickness dimension D2 of the protective film 43 is smaller than the thickness dimension D1 of the covering film 42, when the positive foreign matter Fp approaches the protective film 43, a separation distance between the positive foreign matter Fp and the covering film 42 can be reduced as much as possible. For that reason, a repulsive force can be generated between the positive foreign matter Fp and the covering film 42 at a timing before the positive foreign matter Fp comes into contact with the protective film 43. This makes it possible to inhibit the positive foreign matter Fp from adhering to the protective film 43, the protective film 43 from being damaged due to the contact of the positive foreign matter Fp, and the like.

According to the present embodiment, in the cleaning process in the operation of applying the covering film 42, the housing main body 41 to which the coating agent Q1 has been applied is immersed in the cleaning agent Q2. For that reason, in the outer surface 41a and the flow channel surface 41b of the housing main body 41, the excess coating agent Q1 can be removed on a flat surface, and the excess coating agent Q1 can be appropriately removed on the portion where asperities are formed. For example, in the method of wiping off and removing the excess coating agent Q1, there is a concern that wiping of the coating agent Q1 may occur in the asperity portion of the housing main body 41, or the coating agent Q1 may be wiped off excessively.

According to the present embodiment, the applying process is performed on the housing main body 41 to which the flow rate detection unit 22 is attached. In that case, in a manufacturing line of the air flow meter 14, a work area in which the applying process is performed may be disposed at a tail end of the production line. For that reason, even when the work area in which an applying process is performed is introduced in a conventional production line, a relatively small-scale modification can performed. This makes it possible to inhibit an increase in cost at the time of manufacturing the air flow meter 14 having the covering film 42.

According to the present embodiment, in the chip-type air flow meter 14 having the sensor S/A 36, the covering film 42 is applied to the housing main body 41. In the above chip-type method, the flow rate detection unit 22 is included in the sensor S/A 36, and the sensor S/A 36 is small in the heater portion and can save power, while the heat capacity is small, and therefore if any foreign matter adheres to the flow rate detection unit 22, the detection characteristics of the flow rate detection unit 22 tend to change. For that reason, it is preferable to apply the covering film 42 to the housing main body 41 so that the flow rate detection unit 22 is not negatively charged in order to inhibit an unintentional change in the detection characteristics of the flow rate detection unit 22.

Second Embodiment

In the first embodiment, the housing main body 41 to which the flow rate detection unit 22 is attached is immersed in the coating agent Q1 in the applying process of the coating agent Q1, but in a second embodiment, a housing main body 41 is immersed in a coating agent Q1 in a stage before a flow rate detection unit 22 is attached.

In the second embodiment, the housing main body 41 has a pair of main body members 51. The main body members 51 are components which are combined with each other to form a flow channel forming portion 24, and a boundary portion of the main body members 51 is orthogonal to a width direction X. One of the main body members 51 is a member that forms an outer surface 41a on one side of the housing main body 41 in the width direction X, and the other body member 51 is a member that forms an outer surface 41a on the other side. In that case, the flow channel forming portion 24 is divided into two by the pair of main body members 51. The one main body member 51 is integrally formed with a fitting portion 25, a flange portion 27, and a connector portion 28 in the housing main body 41.

Figure 8A:
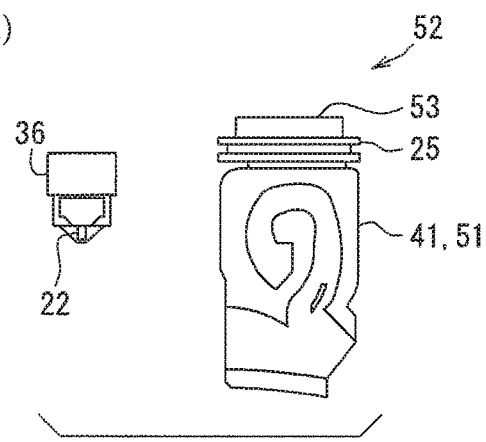

FIG. 8(a) shows a primary molded body 52 formed by primary molding. The primary molded body 52 has one of the main body members 51, the fitting portion 25, and a base portion 53, and the base portion 53 is a portion to be a welded portion for subsequent secondary molding. The base portion 53 extends from the fitting portion 25 toward a side opposite to the main body member 51, and is a portion serving as a base for the flange portion 27 and the connector portion 28. As described above, in the primary molded body 52, the flange portion 27 and the connector portion 28 are not yet formed, and the base portion 53 is only formed. In the primary molded body 52 of FIG. 8(a), the flow rate detection unit 22 is not attached to the housing main body 41.

Figure 8B:
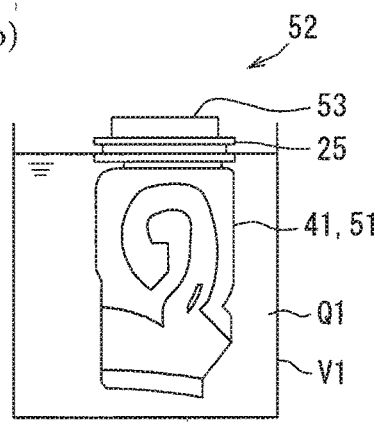
Figure 8C:
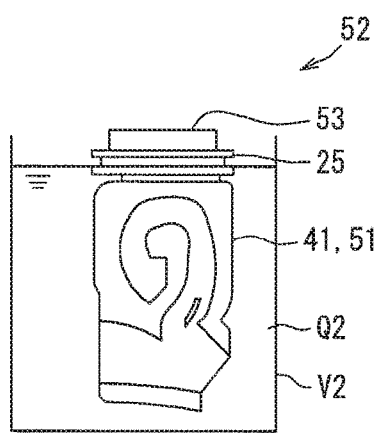
Figure 8D:
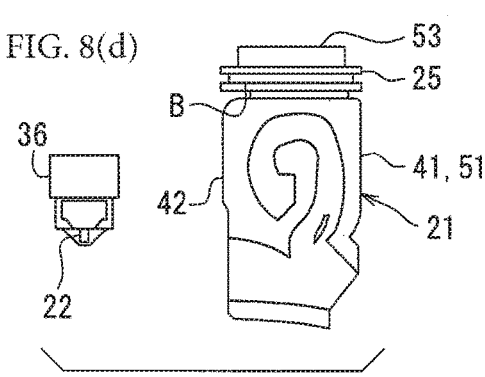
Figure 8E:
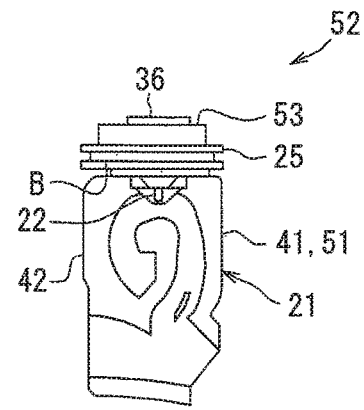

Thereafter, as shown in FIG. 8(b), dipping is performed by immersing the main body member 51 of the primary molded body 52 in a coating agent Q1 as an applying process. In that step, the entire main body member 51 is immersed in the coating agent Q1. Thereafter, as shown in FIG. 8(c), the entire main body member 51 is immersed in a cleaning agent Q2 in the cleaning process, and as shown in FIG. 8(d), the coating agent Q1 and the cleaning agent Q2 are dried in a drying process. After the coating agent Q1 and the cleaning agent Q2 have been dried, as shown in FIG. 8(e), a mounting step of mounting the flow rate detection unit 22 to the primary molded body 52 is performed. In that case, the flow rate detection unit 22 is not covered with a covering film 42, and is included in an exposed region S2.

Figure 8F:
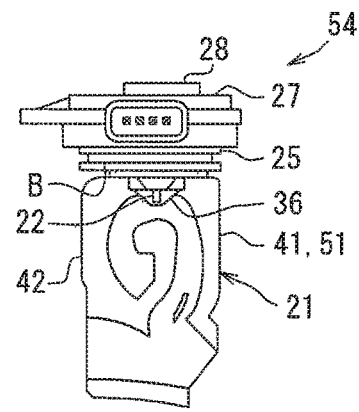

Then, as shown in FIG. 8(f), secondary molding is performed on the primary molded body 52 to produce a secondary molded body 54. In the secondary molding, the flange portion 27 and the connector portion 28 are attached to the base portion 53 of the primary molded body 52. For that reason, the secondary molded body 54 has the flange portion 27 and the connector portion 28 in addition to the one main body member 51 and the fitting portion 25. A sensor S/A 36 is fixed to the housing main body 41 by secondary molding.

The main body member 51 which is not included in the secondary molded body 54 among the pair of main body members 51 is also subjected to an applying process, a cleaning process, and a drying process in the same manner as that of the secondary molded body 54. In the applying process and the cleaning process, similarly to the main body member 51 of the secondary molded body 54, the whole of the main body member 51 not included in the secondary molded body 54 is immersed in the coating agent Q1 and the cleaning agent Q2. After the main body member 51 has been dried, the main body member 51 is attached to the main body member 51 of the secondary molded body 54, and the main body members 51 are joined together. As a result, the air flow meter 14 is completed.

In the present embodiment, in the applying process, when the main body member 51 is immersed in the coating agent Q1, the tip side portion of the fitting portion 25 is also immersed in the coating agent Q1. For that reason, the covering boundary portion B is provided not in the flow channel forming portion 24 but in the fitting portion 25, and a part of the fitting portion 25 is included in the covering region S1. In the present embodiment, as in the first embodiment, the covering boundary portion B is orthogonal to a height direction Y, and is disposed at an intermediate position of the fitting portion 25 in the height direction Y. In this example, a portion included in the covering region S1 in the fitting portion 25 is a portion exposed to the intake passage 12 in a state in which the air flow meter 14 is attached to the intake pipe 12a. For that reason, in the housing main body 41 of the air flow meter 14, the covering film 42 is applied to the entire portion of the intake passage 12 which comes into contact with the intake air.

According to the present embodiment described above, the applying process, the cleaning process, and the drying process are performed on the housing main body 41 before the flow rate detection unit 22 is attached. This makes it possible to provide the covering film 42 and the protective film 43 on a base end side of the flow rate detection unit 22 in the housing main body 41 while realizing a configuration in which the covering film 42 and the protective film 43 are not attached to the flow rate detection unit 22. Therefore, in a state in which the completed air flow meter 14 is attached to the intake pipe 12a, a configuration can be realized in which the surface of the entire portion of the housing 21 which come into contact with the intake air is charged with the positive charges 45.

According to the present embodiment, since the applying process, the cleaning process, and the drying process are performed on the housing main body 41 before assembling the pair of main body members 51, the flow rate detection unit 22 can be easily attached to the housing main body 41 after the above processes have been performed.

Third Embodiment

Figure 9:
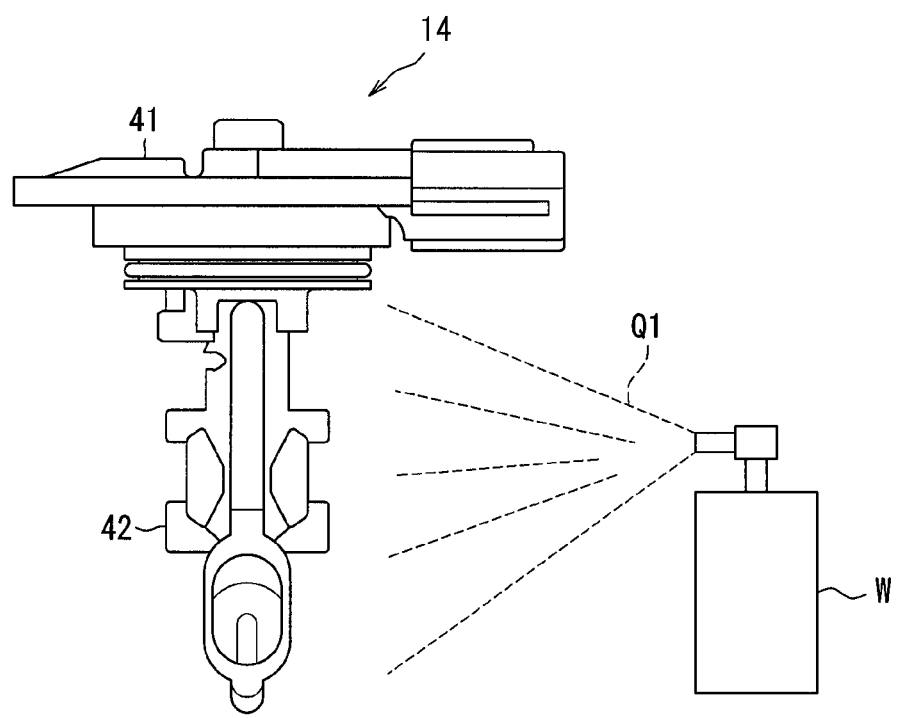
FIG. 9 is a diagram illustrating an applying process according to a third embodiment.
Figure 10:
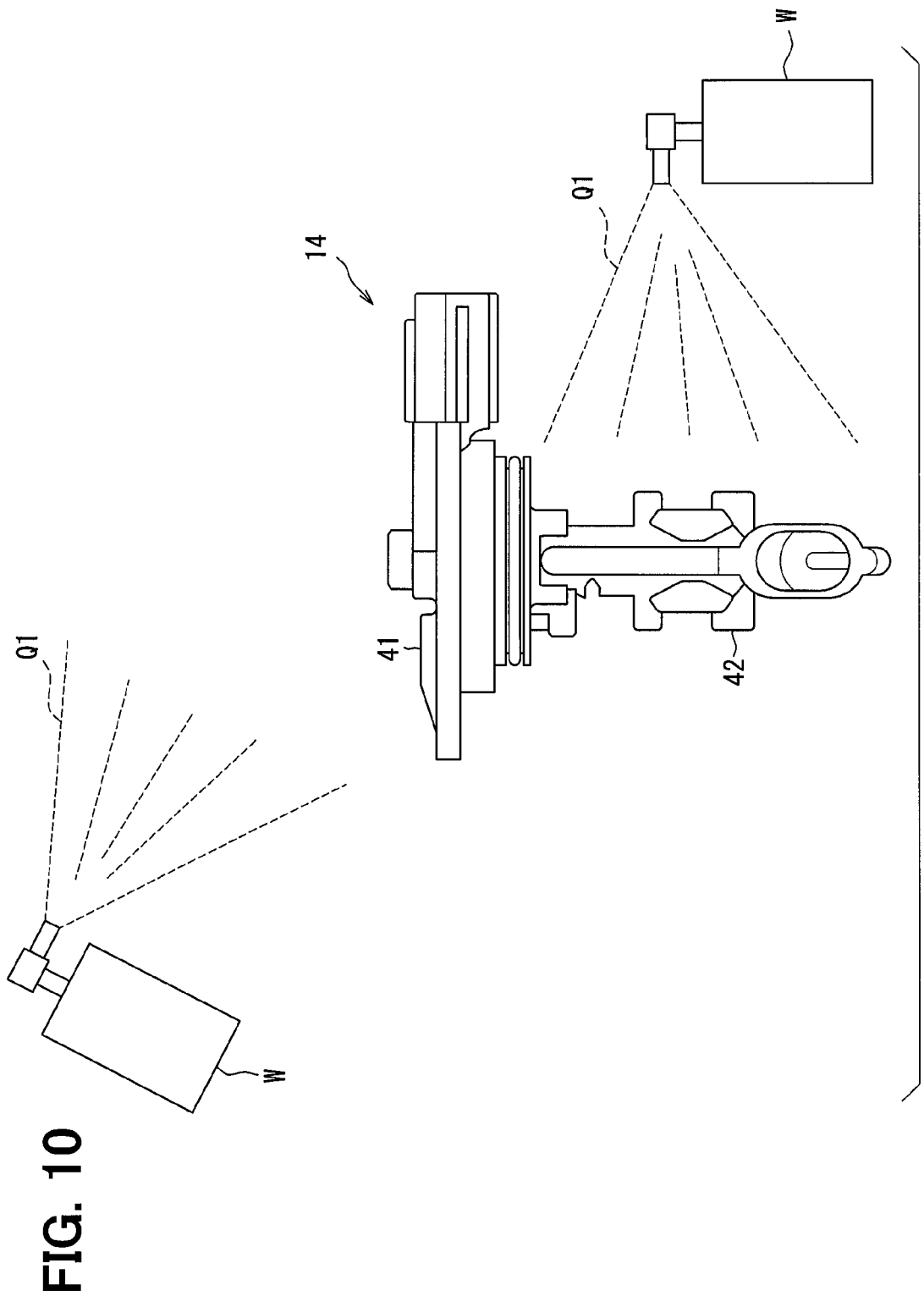
FIG. 10 is a diagram illustrating an applying process.
Figure 11:
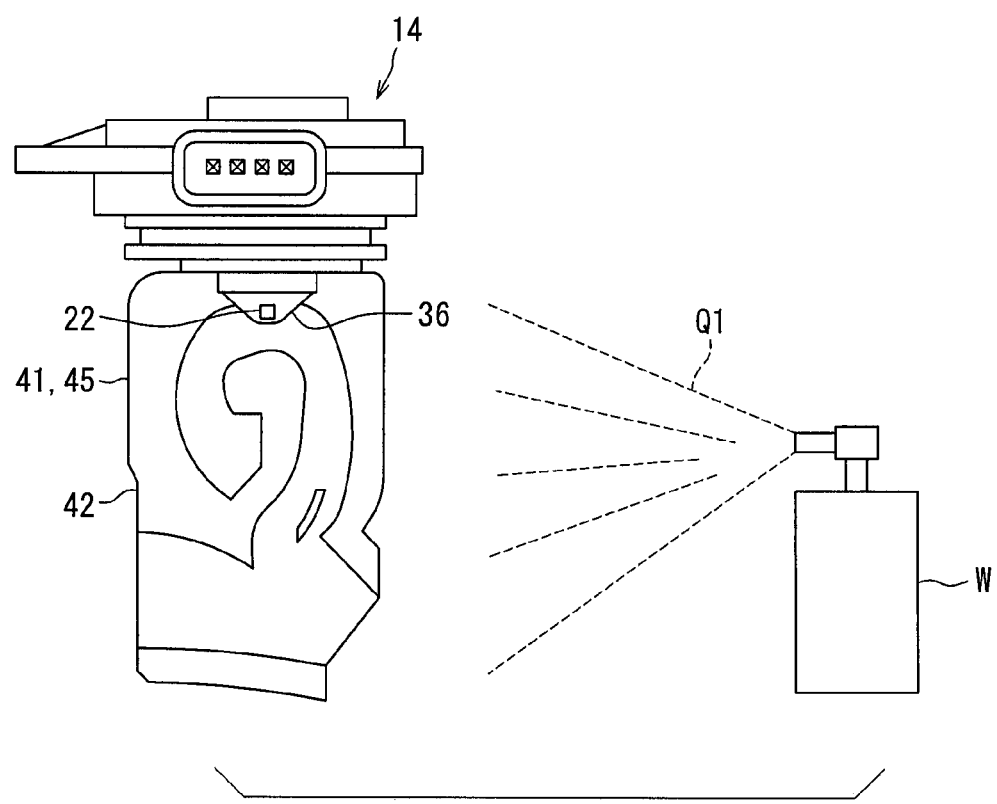
FIG. 11 is a diagram illustrating the applying process.

In the first embodiment, the housing main body 41 is immersed in the coating agent Q1 in the applying process of the coating agent Q1, but in a third embodiment, a coating agent Q1 is sprayed toward a housing main body 41. In the present embodiment, as in the first embodiment, the other steps are completed, leaving a step of applying a covering film 42 and a protective film 43 to the housing main body 41. In the applying process, as shown in FIGS. 9 to 11, the coating agent Q1 is applied to the housing main body 41 by spraying the coating agent Q1 toward the housing main body 41 with the use of a spraying tool W such as a spray can. It should be noted that the method of spraying the coating agent Q1 with a spraying tool W is preferably applied to the case where there is no need to form a covering boundary portion B on the housing main body 41.

In the cleaning process, an excess coating agent Q1 may be wiped from the housing main body 41 with a cloth or the like, and the excess coating agent Q1 may be removed from the housing main body 41 by spraying the cleaning agent Q2 onto the housing main body 41 with the use a spraying tool different from the spraying tool W.

For example, as shown in FIG. 9, in the applying process, the coating agent Q1 is sprayed toward an outer surface 41a of the housing main body 41 by the spraying tool W, and in particular, the coating agent Q1 is applied to a flow channel forming portion 24. In this example, the coating agent Q1 may be applied to the flow channel surface 41b by spraying the coating agent Q1 from an inflow port 33a, an outflow port 33b, and measurement outlets 33c toward the inside of a passage flow channel 31 and a measurement flow channel 32. In addition, the inflow port 33a, the outflow port 33b, and the measurement outlets 33c are covered with a masking tape or the like, so that the coating agent Q1 may not enter into the passage flow channel 31 or the measurement flow channel 32. This makes it possible to prevent the coating agent Q1 from being applied to the flow channel surface 41b. In that case, a covering boundary portion B exists in the inflow port 33a, the outflow port 33b, and the measurement outlets 33c, and the flow channel surface 41b and the flow rate detection unit 22 are included in an exposed region S2.

Further, as shown in FIG. 10, in the applying process, the coating agent Q1 may be sprayed toward the entire outer surface 41a of the housing main body 41 by the spraying tool W. In that case, the entire outer surface 41a is included in the covering region S1. In this example, in the housing main body 41, the coating agent Q1 is applied to both a portion that enters the intake passage 12 and a portion that does not enter the intake passage 12 in a state where the air flow meter 14 is attached to the intake pipe 12a. In this example, as a ratio of a surface area of the housing main body 41 covered with the covering film 42 to the overall surface area is larger, the housing 21 is less likely to be negatively charged, and consequently, the flow rate detection unit 22 is less likely to be negatively charged. For that reason, in the configuration in which the entire outer surface 41a of the housing main body 41 is covered with the covering film 42, a reduction in the detection accuracy of the flow rate detection unit 22 by the positive foreign matter Fp adhering to the flow rate detection unit 22 can be surely inhibited.

In the present embodiment, as in the second embodiment, the applying process, the cleaning process, and the drying process may be performed before the pair of main body members 51 are assembled, and the spraying tool W may be used in the applying process. For example, as shown in FIG. 11, in the housing main body 41, one of the pair of main body members 51 is not attached, but the flow rate detection unit 22 is attached, and at this stage, the coating agent Q1 is sprayed toward both the main body member 51 and the flow rate detection unit 22. In that case, the application of the coating agent Q1 to the housing main body 41 and the flow rate detection unit 22 can be performed collectively. In the configuration in which the flow rate detection unit 22 is covered with the covering film 42, since a repulsive force is generated between the positive foreign matter Fp approaching the flow rate detection unit 22 and the positive charge 45 of the covering film 42, the contamination of the flow rate detection unit 22 by the positive foreign matter Fp can be inhibited more reliably.

It is preferable to apply the coating agent Q1 to the flow rate detection unit 22 after confirming in advance by a test or the like that the detection characteristics do not change or the detection accuracy does not deteriorate even if the coating agent Q1 adheres to the flow rate detection unit 22. When the detection characteristic changes or the detection accuracy decreases, as in the second embodiment, it is preferable to spray and apply the coating agent Q1 to the housing main body 41 at a stage before the flow rate detection unit 22 is attached to the housing main body 41.

Fourth Embodiment

In the first embodiment, the air flow meter 14 is of the chip type, but in a fourth embodiment, an air flow meter is of a bobbin type. In the present embodiment, an air flow meter 60 will be described with reference to FIGS. 12 and 13.

Figure 12:
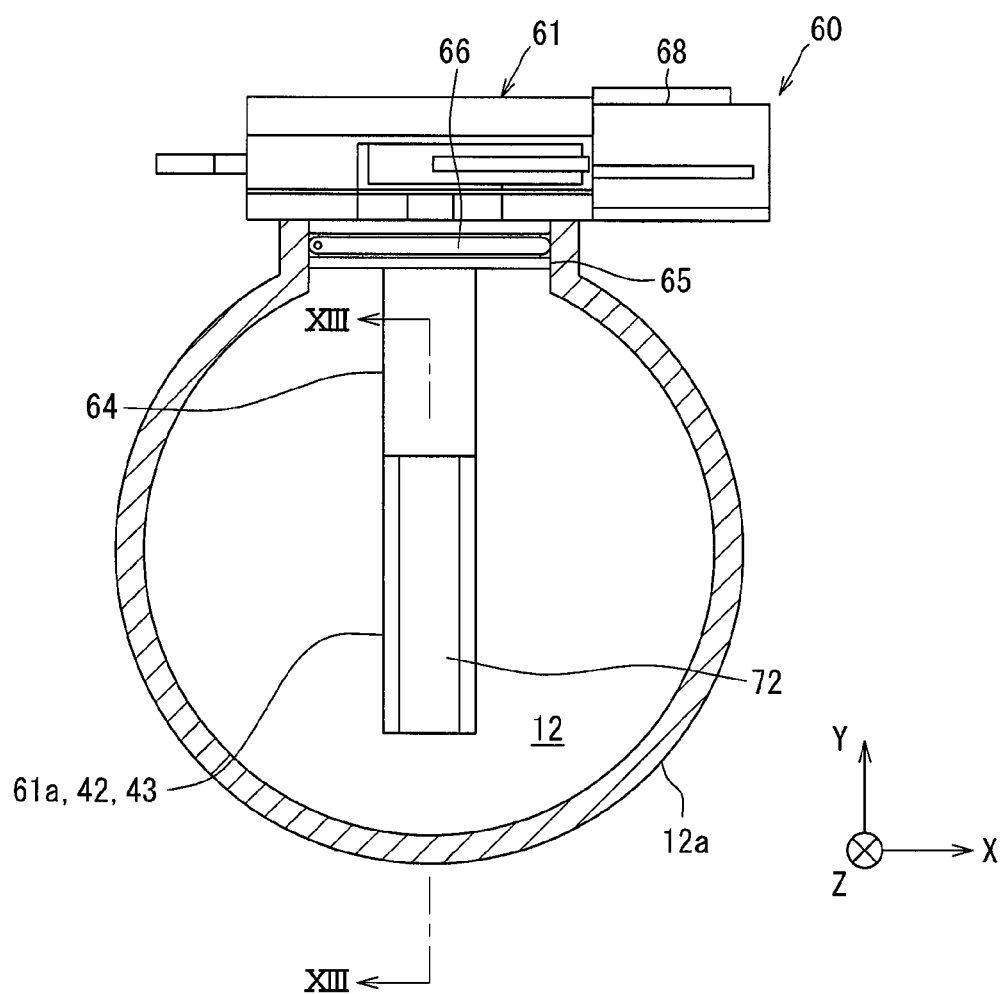
FIG. 12 is a front view of an air flow meter in a state of being attached to an intake pipe according to a fourth embodiment.
Figure 13:
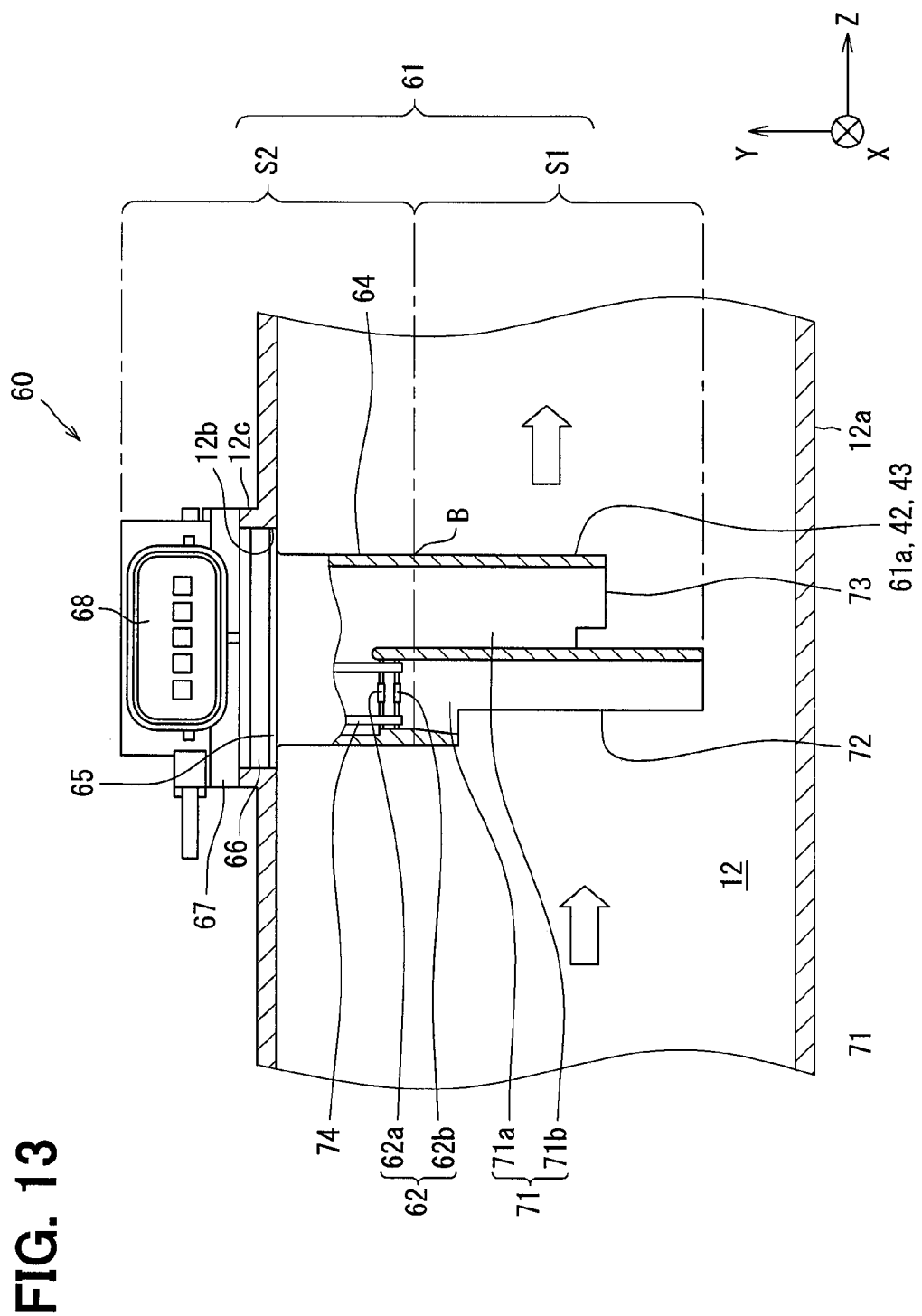
FIG. 13 is a cross-sectional view taken along a line XIII-XIII of FIG. 12.

The air flow meter 60 shown in FIGS. 12 and 13 includes a housing 61 and a flow rate detection unit 62, similarly to the air flow meter 14 of the first embodiment. The housing 61 includes a flow channel forming portion 64, a fitting portion 65, an O-ring 66, a flange portion 67, and a connector portion 68, similarly to the housing 21 of the first embodiment. The flow rate detection unit 62 corresponds to a "physical quantity detection unit".

The flow channel forming portion 64 of the housing 61 forms a bypass flow channel 71, and the bypass flow channel 71 has a bypass inlet 72 as an upstream end portion and a bypass outlet 73 as a downstream end portion. The bypass flow channel 71 has an upper flow channel portion 71*a* extending from the bypass inlet 72 to the base end side and a lower flow channel portion 71*b* extending from the bypass outlet 73 to the base end side, and those flow channel portions 71*a* and 71*b* both extend in the height direction Y. The flow rate detection unit 62 has a heat generating element 62*a* and a temperature sensing element 62*b*, and is supported by a bobbin support portion 74 extending from the housing 61. The flow rate detection unit 62 is provided in the upper flow channel portion 71*a*, and the temperature sensing element 62*b* is disposed at a position closer to the bypass inlet 72 than the heat generating element 62*a*.

In the air flow meter 60 according to the present embodiment, similarly to the air flow meter 14 of the first embodiment, the housing 61 includes a housing main body 61*a*, a covering film 42, and a protective film 43. The housing 61 is divided into a covering region S1 and an exposed region S2 according to the presence or absence of the covering film 42 and the protective film 43. Similarly to the first embodiment, the covering boundary portion B is also disposed on the tip side of the flow rate detection unit 62, and the flow rate detection unit 62 is included in the exposed region S2. In other words, the covering film 42 and the protective film 43 are not applied to the heat generating element 62*a* and the temperature sensing element 62*b*. In the bobbin type air flow meter 60, since it is considered that the detection accuracy is likely to be lowered when the heat generating element 62*a* and the temperature sensing element 62*b* are covered with the covering film 42, it is preferable that the flow rate detection unit 62 is not included in the covering region S1.

At the time of manufacturing the air flow meter 60, similarly to the first embodiment, the housing main body 61*a* is immersed in the coating agent Q1 (not shown) in the applying process to apply the coating agent Q1 to the housing main body 61*a*. As in the third embodiment, the coating agent Q1 may be applied to the housing main body 61*a* by spraying.

Fifth Embodiment

In the first embodiment, the air flow meter 14 has the passage flow channel 31 and the measurement flow channel 32, but in a fifth embodiment, an air flow meter includes a sub-flow channel in addition to a passage flow channel and a measurement flow channel.

Figure 14:
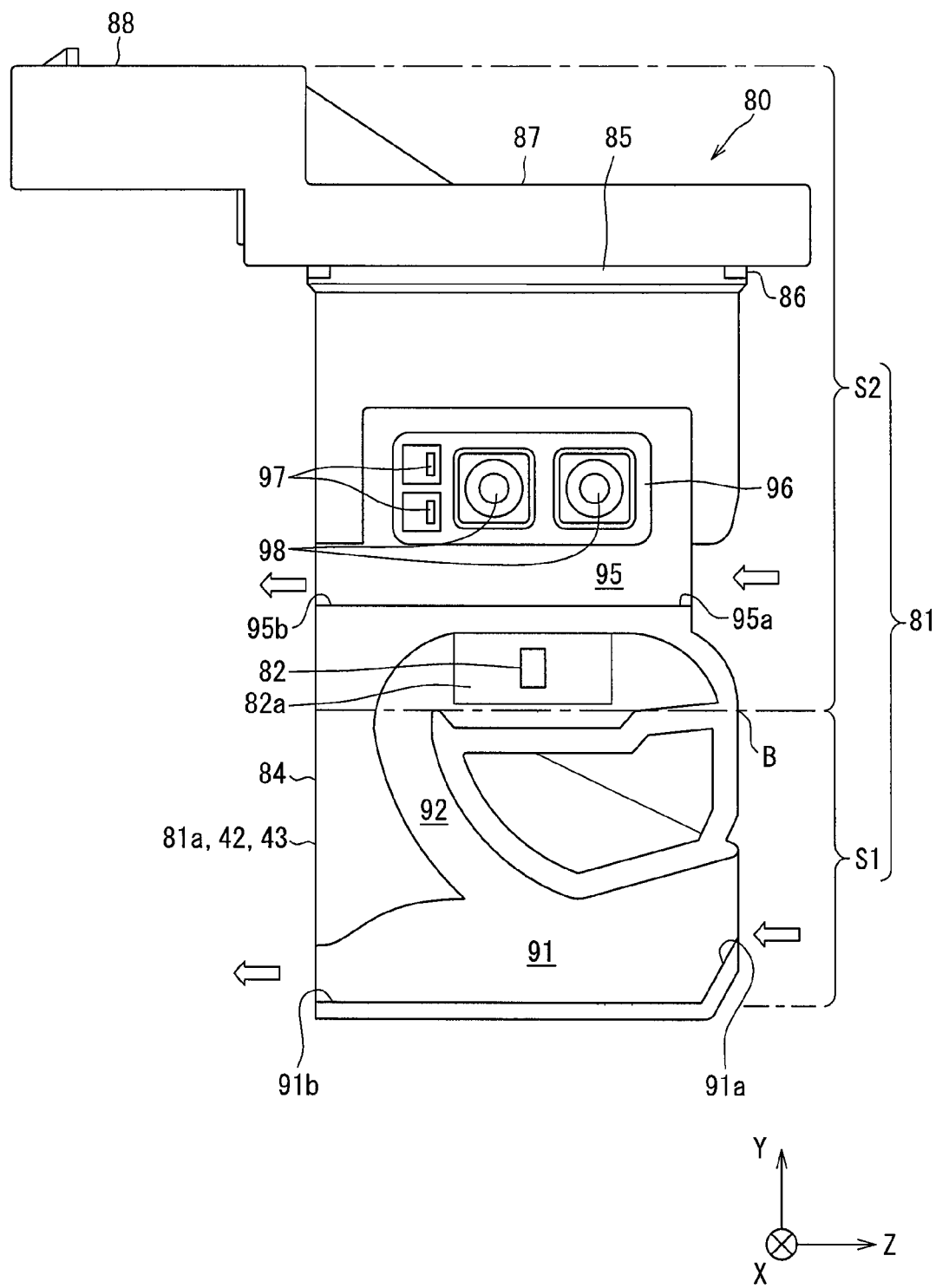
FIG. 14 is a diagram showing an internal structure of an air flow meter according to a fifth embodiment.

An air flow meter 80 shown in FIG. 14 includes a housing 81 and a flow rate detection unit 82, similarly to the air flow meter 14 of the first embodiment. Similarly to the first embodiment, the housing 81 includes a flow channel forming portion 84, a fitting portion 85, an O-ring 86, a flange portion 87, and a connector portion 88, and the flow channel forming portion 84 includes a passage flow channel 91 and a measurement flow channel 92. The flow rate detection unit 82 is mounted on a flow rate substrate 82*a*, and the flow rate substrate 82*a* is provided on the housing 81 in a state in which a portion where the flow rate detection unit 82 is mounted and the flow rate detection unit 82 are exposed to the measurement flow channel 92.

The flow channel forming portion 84 according to the present embodiment has a sub-flow channel 95 in addition to the passage flow channel 91 and the measurement flow channel 92. The sub-flow channel 95 extends in the depth direction Z similarly to the passage flow channel 91, and is disposed between the measurement flow channel 92 and the flange portion 87 in the height direction Y. In the sub-flow channel 95, a sub-inlet 95*a* which is an upstream end portion is disposed closer to the flange portion 87 than an inflow port 91*a* of the passage flow channel 91, and a sub-outlet 95*b* which is a downstream end portion is disposed closer to the flange portion 87 than an outflow port 91*b* of the passage flow channel 91.

A sensor substrate 96 is provided in the sub-flow channel 95, and a humidity detection unit 97 and a pressure detection unit 98 are mounted on the sensor substrate 96. The humidity detection unit 97 detects a humidity of an intake air flowing through the sub-flow channel 95, and the pressure detection unit 98 detects a pressure of the intake air flowing through the sub-flow channel 95. The passage flow channel 91, the measurement flow channel 92, and the sub-flow channel 95 correspond to a "bypass flow channel", and the flow rate detection unit 82, the humidity detection unit 97, and the pressure detection unit 98 correspond to a "physical quantity detection unit".

In the air flow meter 80 according to the present embodiment, similarly to the air flow meter 14 of the first embodiment, the housing 81 includes a housing main body 81*a*, a covering film 42, and a protective film 43. The housing 81 is divided into a covering region S1 and an exposed region S2 according to the presence or absence of the covering film 42 and the protective film 43. Similarly to the first embodiment, the covering boundary portion B is also disposed on the tip side of the flow rate detection unit 82, and the flow rate detection unit 82 is included in the exposed region S2. In the present embodiment, the humidity detection unit 97 and the pressure detection unit 98 are also included in the exposed region S2. For that reason, the detection accuracy can be avoided from being lowered by covering any of the flow rate detection unit 82, the humidity detection unit 97, and the pressure detection unit 98 with the covering film 42.

At the time of manufacturing the air flow meter 80, similarly to the first embodiment, the coating agent Q1 is applied to the housing main body 81*a* by immersing the housing main body 81*a* in the coating agent Q1 (not shown) in the applying process. Further, as in the third embodiment, the coating agent Q1 may be applied to the housing main body 81*a* by spraying the coating agent Q1.

Although a plurality of embodiments according to the present disclosure have been described above, the present disclosure is not construed as being limited to the above-mentioned embodiments, and can be applied to various embodiments and combinations within a scope not departing from the spirit of the present disclosure. Modifications 1 to 11 of the above embodiment will be described.

As Modification 1, in each of the above embodiments, the thickness dimension D2 of the protective film 43 is smaller than the thickness dimension D1 of the covering film 42, but those thickness dimensions D1 and D2 may be the same, and the thickness dimension D2 may be larger than the thickness dimension D1. In either configuration, if the thickness dimension D2 of the protective film 43 is not excessively large, a repulsive force tends to occur between the positive charge 45 of the covering film 42 and the positive foreign matter Fp.

Figure 15:
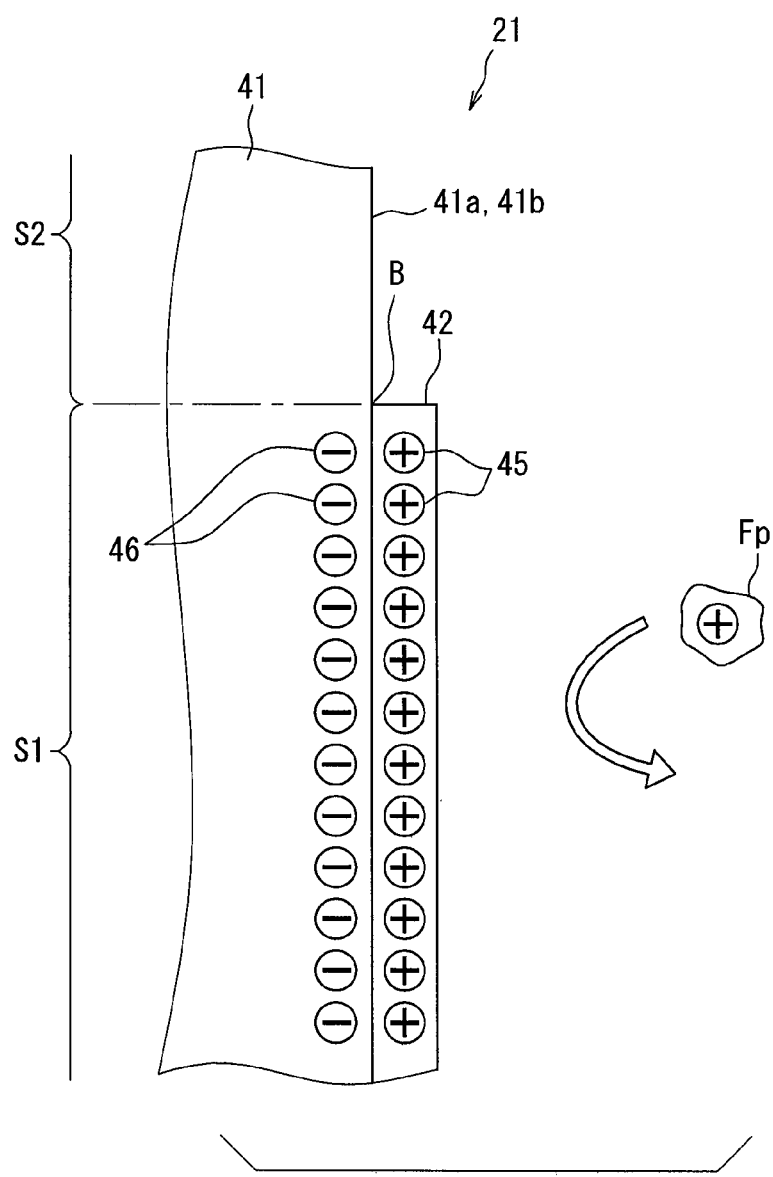
FIG. 15 is a schematic diagram illustrating a covering film according to Modification 2.

As Modification 2, in each of the above embodiments, the housing 21 has both the covering film 42 and the protective film 43, but as shown in FIG. 15, the housing 21 may not have the protective film 43. Similarly, in the above configuration, a repulsion force is likely to occur between the positive charges 45 of the covering film 42 and the positive foreign matter Fp. Further, since the coating agent Q1 for forming the covering film 42 contains a silicon component and a fluororesin component, the surface of the covering film 42 becomes smooth. For that reason, even if the foreign matter comes into contact with the covering film 42, a friction between the foreign matter and the covering film 42 is inhibited from occurring, and the foreign matter is inhibited from adhering to the covering film 42. In other words, contamination of the covering film 42 by foreign matter is inhibited. In addition, since the covering film 42 contains a silicon component or a fluororesin component, a water repellent effect can be imparted to the covering film 42, and a salt damage countermeasure can be applied to the covering film 42.

Figure 16:
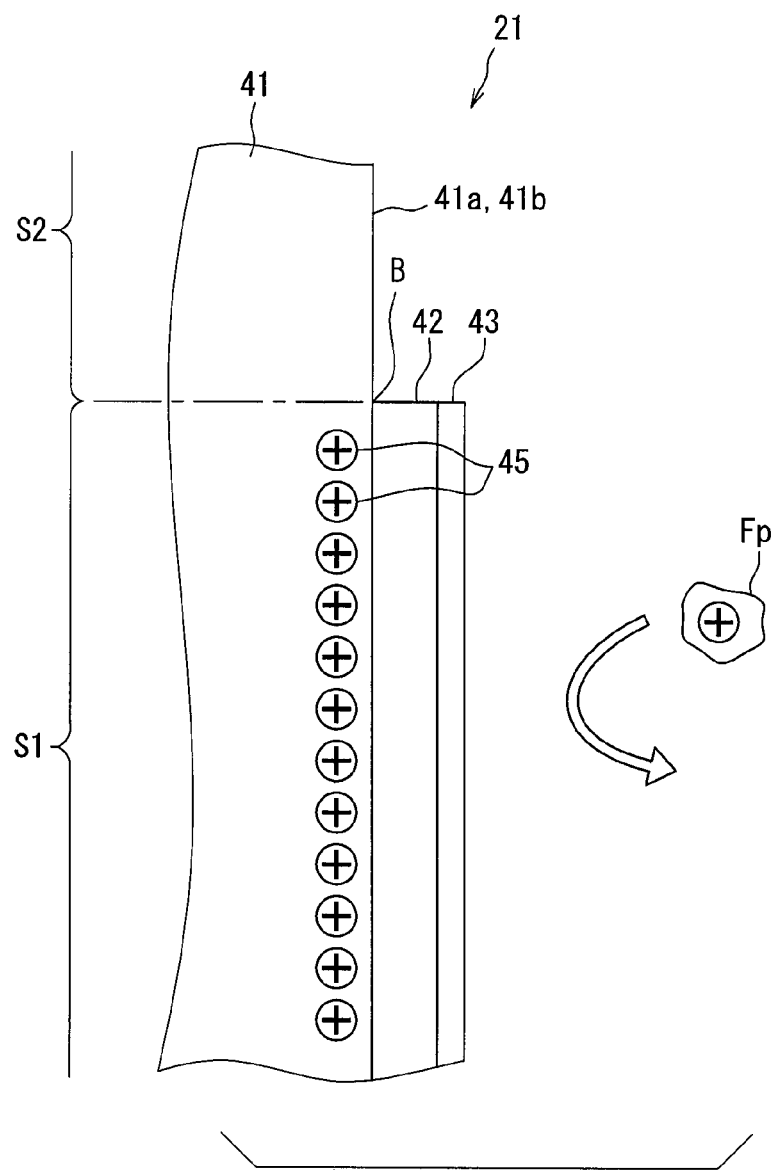
FIG. 16 is a schematic diagram illustrating a covering film according to Modification 3.

As Modification 3, in each of the above embodiments, the covering film 42 has the positive charges 45, but as shown in FIG. 16, the housing main body 41 may have the positive charges 45. In the above configuration, the positive charges 45 are arranged along the outer surface 41a and the flow channel surface 41b which are the surfaces of the housing main body 41. In that case, the housing main body 41 is less likely to be negatively charged as compared with a configuration in which the covering film 42 is not provided. Similarly, in the above configuration, if the thickness dimension D1 of the covering film 42 and the thickness dimension D2 of the protective film 43 are not excessively large, a repulsion force tends to occur between the positive charges 45 and the positive foreign matter Fp, and the positive foreign matter Fp can be prevented from adhering to the protective film 43.

As Modification 4, in the first, fourth, and fifth embodiments, the flow rate detection units 22, 62, and 82 are included in the exposed region S2, but those flow rate detection units 22, 62, and 82 may be included in the covering region S1. For example, the entire housing main bodies 41, 61a, and 81a are immersed in the coating agent Q1 to set the entire housing main bodies 41, 61a, and 81a as the covering region S1. Further, for example, in the fifth embodiment, the covering boundary portion B is placed between the measurement flow channel 92 and the sub-flow channel 95. In the above configuration, the flow rate detection unit 82 is included in the covering region S1, while the humidity detection unit 97 and the pressure detection unit 98 are included in the exposed region S2. In that case, when the covering film 42 is formed by immersing the housing main body 81a in the coating agent Q1, the flow rate detection unit 82 is covered with the covering film 42, while the humidity detection unit 97 and the pressure detection unit 98 are not covered with the covering film 42.

In the fifth embodiment, the covering boundary portion B is placed on the base end side of the sub-flow channel 95. In the above configuration, in addition to the flow rate detection unit 82, the humidity detection unit 97 and the pressure detection unit 98 are also included in the covering region S1, and the housing main body 81a is immersed in the coating agent Q1 in the applying process, thereby being capable of covering any of those detection units 82, 97, and 98 with the covering film 42. In the above case, in any of the flow rate detection unit 82, the humidity detection unit 97, and the pressure detection unit 98, the positive charges 45 of the covering film 42 can more reliably inhibit the contamination by the positive foreign matter Fp.

As Modification 5, in the above-mentioned Embodiments 1, 2, 4, and 5, the covering boundary portion B is orthogonal to the height direction Y, but the covering boundary portion B may not be orthogonal to the height direction Y. For example, the covering boundary portion B may extend in the height direction Y, and the covering boundary portion B may be inclined in the depth direction Z. Further, multiple covering boundary portions B may be provided. For example, in the height direction Y, the covering boundary portion B is placed on both the tip side and the base end side of the flow rate detection unit. In the above configuration, the flow rate detection unit is included in the covering region S1, and the exposed region S2 is located on both the tip side and the base end side of the covering region S1.

As Modification 6, in the first, second, fourth, and fifth embodiments, in the housing main body, the covering boundary portion B is placed at the same position on the outer surface and the flow channel surface, but the covering boundary portion B may be placed at different positions on the outer surface and the flow channel surface of the housing main body. For example, the covering boundary portion B exists on the outer surface of the housing main body, while the covering boundary portion B does not exist on the flow channel surface. For example, in the first embodiment, the outer surface 41a of the housing main body 41 is partially covered with the covering film 42, while the flow channel surface 41b is entirely covered with the covering film 42.

As Modification 7, in each of the above-mentioned embodiments, the covering film may be formed only on the upstream side of the flow rate detection unit in the measurement flow channel, or the covering film may be formed only on the downstream side. For example, in the first embodiment, in the flow channel surface 41b, the entire portion forming the passage flow channel 31 is covered with the covering film 42, and in the portion forming the measurement flow channel 32, the upstream side of the flow rate detection unit 22 is covered with the covering film 42. In the above configuration, in the passage flow channel 31 and the measurement flow channel 32, the positive foreign matter Fp is less likely to adhere to the flow channel surface 41b on the upstream side of the flow rate detection unit 22. This makes it possible to inhibit a mass formed by the accumulation of the positive foreign matter Fp on the flow channel surface 41b from peeling off and colliding with the flow rate detection unit 22. In addition, in the flow channel surface 41b, the downstream side of the flow rate detection unit 22 in the portion forming the measurement flow channel 32 may be covered with the covering film 42.

As Modification 8, in each of the above embodiments, the covering boundary portion B includes each end portion of the covering film 42 and the protective film 43, but the protective film 43 may not be included in the covering boundary portion B. For example, the protective film 43 covers the housing main body 41 in both the covering region S1 and the exposed region S2 regardless of the position of the covering boundary portion B. The protective film 43 covers a part of the covering film 42. In either configuration, at least a part of the covering film 42 can be protected by the protective film 43.

As Modification 9, in each of the embodiments described above, the flow rate detection unit is provided in the measurement flow channel as the physical quantity detection unit, but the physical quantity detection unit provided in the measurement flow channel may be a humidity detection unit, a temperature detection unit, or a pressure detection unit.

As Modification 10, in each of the above-mentioned embodiments, the measurement flow channel has a circulating shape, but the measurement flow channel may have a shape extending in the depth direction Z without circulating. In addition, as Modification 11, in each of the embodiments described above, the air flow meter may have only the measurement flow channel out of the passage flow channel and the measurement flow channel. In that case, the upper end portion of the measurement flow channel serves as an inflow port.

As Modification 11, the covering film 42 may be applied only to the flow rate detection unit 22 in the sensor S/A 36. The covering film 42 may be applied to a portion of the sensor S/A 36 excluding the flow rate detection unit 22. This configuration includes a configuration in which the covering film 42 is provided to only at least a part of the detection support portion 38 in the sensor S/A 36, and a configuration in which the covering film 42 is provided to only at least a part of the sealing portion 39. In addition, a configuration in which the covering film 42 is provided only to the detection support portion 38 and the sealing portion 39, or a configuration in which the covering film 42 is provided to at least a portion of the case body 37 excluding the detection support portion 38 can also be proposed.

Although the present disclosure has been described in accordance with the examples, it is understood that the disclosure is not limited to such examples or structures. The present disclosure encompasses various modifications and variations within the scope of equivalents. In addition, it should be understood that various combinations or aspects, or other combinations or aspects, in which only one element, one or more elements, or one or less elements are added to the various combinations or aspects, also fall within the scope or technical idea of the present disclosure.

The invention claimed is:

1. A physical quantity measurement device for measuring a physical quantity of a fluid, comprising:
    a housing that includes a bypass flow channel through which a fluid flows; and
    a physical quantity detection unit that detects a physical quantity of the fluid in the bypass flow channel, wherein
    the housing includes
        a housing main body made of a dielectric, and
        a covering film that covers at least a part of a surface of the housing main body, and
    the surface of the housing is positive charged due to positive charges being arranged in the housing main body along the surface of the housing main body or the positive charges being arranged in the covering film along a surface of the covering film.

2. The physical quantity measurement device according to claim 1, wherein
    the housing includes
        a covering region in which the surface of the housing main body is covered with the covering film, and
        an exposed region in which the surface of the housing main body is not covered with the covering film,
    the covering region and the exposed region are arranged one after another along a predetermined direction of the housing, and
    the physical quantity detection unit is included in the exposed region.

3. The physical quantity measurement device according to claim 1, wherein
    the surface of the housing main body includes a flow channel surface that defines the bypass flow channel, and
    the covering film covers at least a part of the flow channel surface.

4. The physical quantity measurement device according to claim 1, wherein the covering film covers at least a part of an outer surface of the housing main body.

5. The physical quantity measurement device according to claim 1 wherein the housing includes a protective film that protects the covering film by covering at least a part of the surface of the covering film.

6. A method of manufacturing a physical quantity measurement device including a housing that includes a bypass flow channel through which a fluid flows, and a physical quantity detection unit that detects a physical quantity of the fluid in the bypass flow channel, in which the housing includes a housing main body made of a dielectric, and a covering film that covers at least a part of a surface of the housing main body, and the surface of the housing is positive charged due to positive charges being arranged in the housing main body along the surface of the housing main body or the positive charges being arranged in the covering film along a surface of the covering film, the method comprising:
    applying a coating agent for forming the covering film to the surface of the housing main body;
    cleaning the housing main body while the housing main body is coated with the coating agent; and
    after cleaning the housing main body, drying the coating agent which is coated on the surface of the housing main body.

7. The method of manufacturing a physical quantity measurement device according to claim 6, wherein
    the housing main body is immersed in the coating agent to apply the coating agent to the surface of the housing, and
    the housing main body is immersed in a cleaning agent while coated with the coating agent to clean the housing main body.

8. The method of manufacturing a physical quantity measurement device according to claim 7, wherein the coating agent is applied to the surface of the housing main body after the physical quantity detection unit is attached to the housing main body.

9. The method of manufacturing a physical quantity measurement device according to claim 6, wherein the coating agent is sprayed to the housing main body to apply the coating agent to the surface of the housing.

10. A physical quantity measurement device, comprising:
    a housing that includes a bypass flow channel through which a fluid flows; and
    a flow rate sensor configured to detect a flow rate of the fluid in the bypass flow channel, wherein
    the housing includes
        a housing main body made of a dielectric, the housing main body having a flow passage surface configured to receive the fluid flow, and
        a covering film that covers the flow passage surface of the housing main body, the covering film being formed of a positive charged material and
    the positive charged covering film is configured to repulse foreign matter included in the fluid flow from adhering to the flow passage surface of the housing main body.

* * * * *